United States Patent
Hung et al.

(10) Patent No.: US 12,073,036 B2
(45) Date of Patent: Aug. 27, 2024

(54) POSITION DETECTION DEVICE

(71) Applicant: WACOM CO., LTD., Saitama (JP)

(72) Inventors: Ipei Hung, Saitama (JP); Henry Wong, Portland, OR (US); Akiyuki Kake, Saitama (JP); Kizuku Ishimaru, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/174,505

(22) Filed: Feb. 24, 2023

(65) Prior Publication Data

US 2023/0214031 A1    Jul. 6, 2023

Related U.S. Application Data

(63) Continuation of application No. PCT/JP2021/028229, filed on Jul. 30, 2021.

(30) Foreign Application Priority Data

Sep. 4, 2020  (JP) .................. 2020-148841

(51) Int. Cl.
  *G06F 3/038* (2013.01)
  *G06F 1/16* (2006.01)
  *G06F 3/0346* (2013.01)

(52) U.S. Cl.
  CPC ............ *G06F 3/038* (2013.01); *G06F 1/1616* (2013.01); *G06F 1/1652* (2013.01); *G06F 1/1694* (2013.01); *G06F 3/0346* (2013.01)

(58) Field of Classification Search
  None
  See application file for complete search history.

(56) References Cited

U.S. PATENT DOCUMENTS

2002/0141144 A1* 10/2002 Prakash ................ G06F 1/1677
                                                                361/679.04
2010/0056223 A1*  3/2010 Choi .................... G06F 1/1686
                                                                455/566

(Continued)

FOREIGN PATENT DOCUMENTS

JP    2005266226 A    9/2005
JP    2010157060 A    7/2010

(Continued)

OTHER PUBLICATIONS

JP-2011018228-A English translation (Year: 2011).*
International Search Report, mailed Nov. 2, 2021, for International Application No. PCT/JP2021/028229, 3 pages.

*Primary Examiner* — Dorothy Harris
(74) *Attorney, Agent, or Firm* — Seed IP Law Group LLP

(57) ABSTRACT

A position detection device includes a position detection sensor including a position detection region corresponding to an instruction input surface for receiving an instruction input by an indicator, a position detection circuit which, in operation, detects at least a position of an instruction in the position detection region of the position detection sensor based on an interaction of the position detection sensor and the indicator, and a plurality of motion sensors. The position detection sensor includes a flexibly displaceable part that is deformable together with the instruction input surface according to an operation of a user, and the flexibly displaceable part is disposed between two of the motion sensors.

17 Claims, 13 Drawing Sheets

(56) References Cited

U.S. PATENT DOCUMENTS

| | | | |
|---|---|---|---|
| 2010/0164888 A1 | 7/2010 | Okumura et al. | |
| 2011/0069347 A1* | 3/2011 | Kawabuchi | G06F 3/147 |
| | | | 358/1.15 |
| 2015/0227173 A1* | 8/2015 | Hwang | G06F 1/1652 |
| | | | 345/619 |
| 2016/0132074 A1* | 5/2016 | Kim | G06F 1/1652 |
| | | | 345/173 |
| 2018/0121056 A1* | 5/2018 | Kyoya | G06F 1/1681 |
| 2018/0329713 A1* | 11/2018 | Han | G06F 9/44 |
| 2018/0348810 A1* | 12/2018 | Giesselmann | H04Q 9/00 |
| 2019/0243472 A1* | 8/2019 | Stafford | A63F 13/216 |
| 2020/0089646 A1* | 3/2020 | Hatayama | G06F 15/0225 |
| 2020/0142426 A1* | 5/2020 | Gist, IV | G01S 17/86 |

FOREIGN PATENT DOCUMENTS

| | | | |
|---|---|---|---|
| JP | 2011018228 A | * | 1/2011 |
| JP | 2011018228 A | | 1/2011 |
| JP | 2012094100 A | | 5/2012 |
| JP | 2012230563 A | | 11/2012 |
| JP | 2014099112 A | | 5/2014 |
| JP | 2018073210 A | | 5/2018 |

* cited by examiner

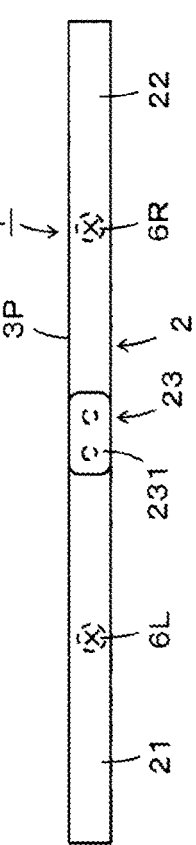
FIG. 4A
FIG. 4B
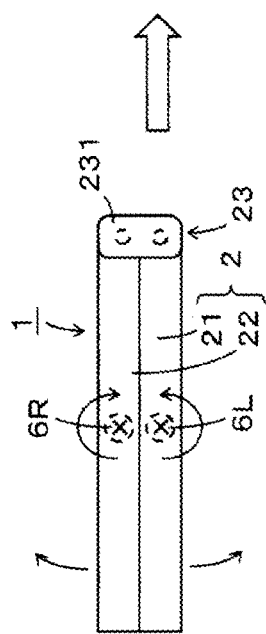
FIG. 4C
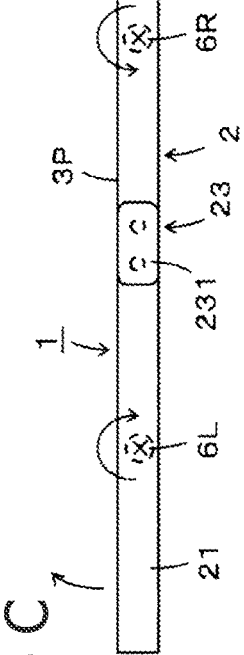
FIG. 4D
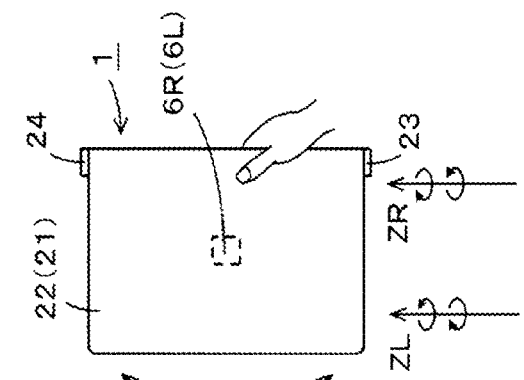
FIG. 4E
FIG. 4F
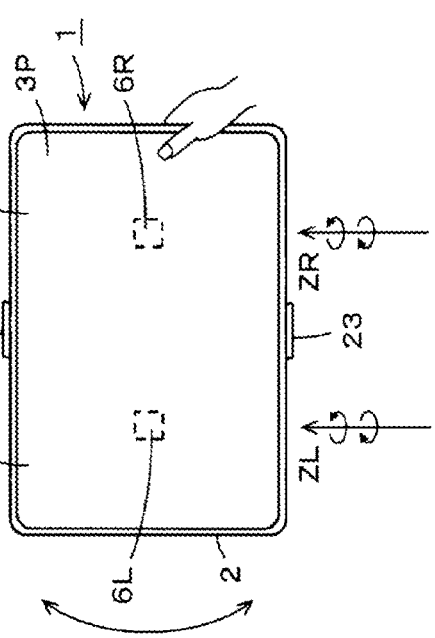

POSITION DETECTION DEVICE

BACKGROUND

Technical Field

The disclosure relates to a position detection device including a position detection sensor.

Description of the Related Art

A position detection device with a position detection sensor configured as a portable device is well-known. For example, a portable device, such as a high-performance portable phone terminal called a smartphone and a mobile PC (PC is an abbreviation for Personal Computer), includes a position detection sensor. The position indicated by an indicator, such as a finger and an electronic pen, is detected, and various types of input can be performed on the basis of the detection results.

Recently, this type of portable device includes a motion sensor, such as a gyro sensor and an acceleration sensor. The motion sensor detects the direction of the portable device, such as a vertical direction (vertical use) and a horizontal direction (horizontal use), as a state change of the portable device. A display image to be displayed on a display screen can be rotated and displayed according to the direction of the portable device based on the detection result.

In recent years, electronic paper that is flexible and thin like paper and that can display and hold an image in a non-power supply state is prized as a medium for browsing a document that can replace paper.

An example of this type of electronic paper is proposed, the electronic paper allowing the user to execute processes, such as a deletion instruction of a display image and a page turning process, in response to detection of a state change of the electronic paper, such as a rotation displacement in which the user rotates or flips the electronic paper and a movement displacement in which the user moves the electronic paper to a predetermined place, without the need of button operations (for example, see Japanese Patent Laid-open No. 2005-266226).

In Japanese Patent Laid-Open No. 2005-266226, one sensor, such as a tilt detection sensor, a rotation detection sensor, a bend detection sensor, and an overlap detection sensor, is provided in a housing of the electronic paper. One operation, such as deletion of an information image from a display unit, switch (page turning) of an information image displayed and held, and page alignment or copy of an information image, can be performed in response to the detection of a state change of the electronic paper detected by the sensor.

BRIEF SUMMARY

In this way, conventionally, the state change of a portable device is detected, and the detection result is used for processing in the portable device.

However, in the conventional portable device with a display screen, the motion sensor, such as a gyro sensor and an acceleration sensor, is mainly used only for rotating the display image of the display screen, and the motion sensor is not used for other uses.

In this regard, the electronic paper of Japanese Patent Laid-open No. 2005-266226 is convenient that an operation, such as the rotation of the display image, deletion of a display image, and page turning, can be performed on the basis of the detection result of the state change of the electronic paper.

However, one state change of the housing of the electronic paper corresponding to the operation to be performed in the electronic paper needs to be set, and sensors for detecting the state change need to be provided on the housing of the electronic paper in Japanese Patent Laid-open No. 2005-266226. Therefore, to perform a plurality of operations in the electronic paper, a plurality of types of sensors, such as a tilt detection sensor, a rotation detection sensor, a bend detection sensor, and an overlap detection sensor, need to be provided on the electronic paper to detect state changes different from each other. There is a problem that the configuration becomes complicated.

An object of the disclosure is to provide a position detection device that can solve the above problems.

To solve the problem, provided is a position detection device including a position detection sensor including a position detection region corresponding to an instruction input surface for receiving an instruction input by an indicator, a position detection circuit which, in operation, detects at least a position of an instruction in the position detection region of the position detection sensor based on an interaction of the position detection sensor and the indicator, a plurality of motion sensors, and a holding circuit which in operation, holds output data from the position detection circuit and output data from the first and second motion sensors in a state in which the output data from the position detection circuit and the output data from the first and second motion sensors can be associated, in which the position detection sensor includes a flexibly displaceable part that is deformable together with the instruction input surface according to an operation of a user, and the flexibly displaceable part extends between two of the motion sensors.

In the position detection device configured as described above, the motion sensors arranged through the flexibly displaceable part can change state due to the existence of the flexibly displaceable part. Therefore, a plurality of types of processes in the position detection device can be easily associated based on the movement detected by the motion sensors. Various processes of the position detection device can be executed without the need of button operations, and the movement of the position detection device can be detected. For example, a state of the position detection device at predetermined time can be specified.

BRIEF DESCRIPTION OF THE SEVERAL VIEWS OF THE DRAWINGS

FIGS. 4A to 4F are diagrams used for describing an operation of the parts in the example of the portable device as the first embodiment of the position detection device according to the disclosure;

DETAILED DESCRIPTION

Some embodiments of a position detection device according to the disclosure will now be described with reference to the drawings.

First Embodiment

Figure 1B:
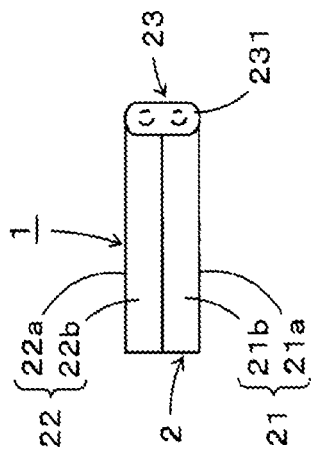
FIGS. 1A to 1C are diagrams for describing an example of a portable device as a first embodiment of a position detection device according to the disclosure.
Figure 1A:
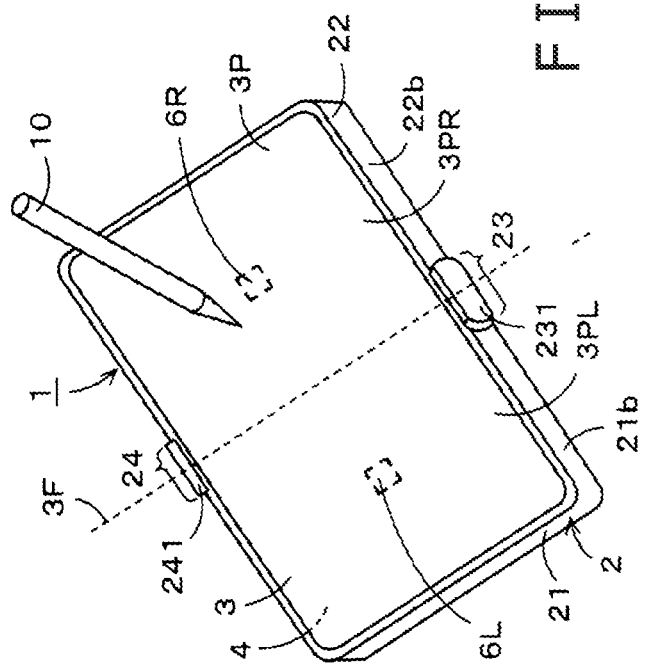
Figure 1C:
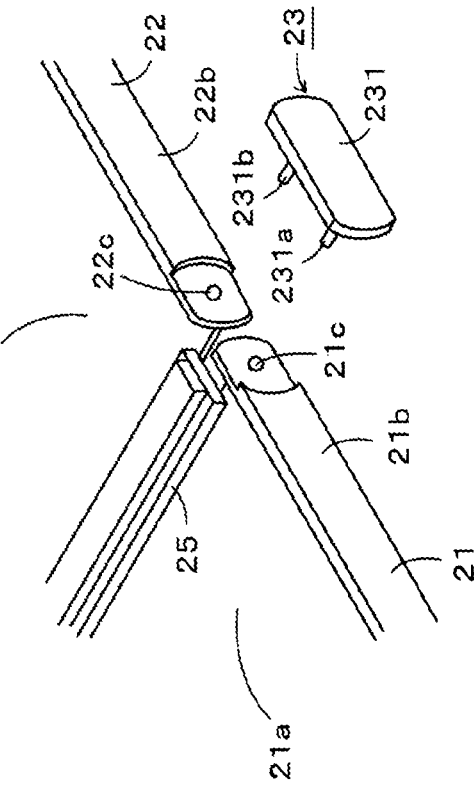

FIGS. 1A to 1C illustrate an example of a portable device configured as a first embodiment of the position detection device according to the disclosure. A bendable housing is used to provide a foldable portable device in the example.

FIGS. 1A to 1C are diagrams for describing an overview of the configuration of the portable device as a position detection device of the embodiment. A portable device 1 of the example includes a flexible display element 3, and a foldable position detection sensor of electromagnetic induction coupling type is used in the portable device 1. Note that the portable device 1 in the example of FIGS. 1A to 1C can be folded (valley fold) on the display screen side of the flexible display element 3.

FIG. 1A illustrates a state in which the portable device 1 of the example is fully open, and FIG. 1B illustrates a state in which the portable device 1 is folded. FIG. 1C illustrates an example of a hinge structure for making the portable device 1 of the example foldable. In the portable device 1 of the example, a display screen 3P of the flexible display element 3 is exposed in the state in which the portable device 1 is open as illustrated in FIG. 1A. When an electronic pen 10 of electromagnetic induction coupling type is used to indicate a position on the display screen 3P, a position detection sensor 4 of electromagnetic induction coupling type provided on a lower part (back side) of the display screen 3P detects the position indicated by the electronic pen 10.

In the embodiment, a display region of the display screen 3P and a position detection region of the position detection sensor 4 are substantially the same. The display screen 3P is an input surface for indicating the position using the electronic pen 10, and the position detection sensor 4 detects the indicated position of the electronic pen 10 in the entire region.

An outer casing (housing) 2 of the portable device 1 in the example includes a first frame member 21 and a second frame member 22 connected and foldable at hinge portions 23 and 24 as illustrated in FIGS. 1A, 1B, and 1C. Therefore, the outer casing 2 includes a flexibly displaceable part that is a band-shaped part connecting the hinge portion 23 and the hinge portion 24.

In the first frame member 21 and the second frame member 22, wall portions 21b and 22b are formed around bottom portions 21a and 22a so as to form a flat recessed portion that houses the flexible display element 3, the position detection sensor 4, and an electronic circuit unit (not illustrated in FIGS. 1A to 1C) connected to the flexible display element 3 and the position detection sensor 4 as illustrated in FIGS. 1A to 1C. However, the wall portions 21b and 22b are not formed on sides of the bottom portions 21a and 22a of the first frame member 21 and the second frame member 22, the sides opposing on the hinge portion 23 and 24 side.

Therefore, the part between the hinge portion 23 and the hinge portion 24 may become an opening in the folded state of FIG. 1B, and dust may enter. Thus, a protection plate 25 (see FIG. 1C) is arranged at the part between the hinge portion 23 and the hinge portion 24 in the embodiment.

In the hinge portions 23 and 24 of the portable device 1 in the example, the first frame member 21 and the second frame member 22 have a 2-axis hinge structure that allows them to pivot at different rotation axis positions. The hinge portion 23 and the hinge portion 24 have similar configurations. Therefore, only the structure of the hinge portion 23 will be described here, and the hinge portion 24 will not be described.

That is, a through hole 21c for fitting a pivot shaft is formed on an end of the wall portion 21b of the first frame member 21 at the hinge portion 23 as illustrated in FIG. 1C. Similarly, a through hole 22c for fitting a pivot shaft is formed on an end of the wall portion 22b of the second frame member 22 at the hinge portion 23 as illustrated in FIG. 1C.

A hinge composition plate 231 including a pin 231a and a pin 231b to be inserted into the through hole 21c and the through hole 22c is further prepared. In this case, the diameter of the pin 231a and the pin 231b is smaller than the diameter of the through hole 21c and the through hole 22c. The pin 231a and the pin 231b of the hinge composition plate 231 are inserted into the through hole 21c of the wall portion 21b of the first frame member 21 and the through hole 22c of the wall portion 22b of the second frame member 22, respectively, and in this way, the hinge composition plate 231 pivotably connects the first frame member 21 and the second frame member 22 at the hinge portion 23. In this case, a fall-out prevention member not illustrated is fitted to the tip side of the pin 231a and the pin 231b inserted into the through hole 21c and the through hole 22c to thereby prevent the hinge composition plate 231 from being separated.

The configuration is similar on the hinge portion 24 side. A hinge composition plate 241 is attached, and the first frame member 21 and the second frame member 22 are pivotably connected at the hinge portion 24.

In this way, the first frame member 21 and the second frame member 22 are pivotably connected at the hinge portion 23 and the hinge portion 24 in the portable device 1 of the embodiment, and the state of the outer casing 2 can be changed from the folded state as illustrated in FIG. 1B to the fully open state as illustrated in FIG. 1A. Note that a position 3F indicated by a dotted line in FIG. 1A represents a bend position of the display screen 3.

In the portable device 1 of the embodiment, the first frame member 21 and the second frame member 22 of the outer casing 2 can pivot at different rotation axis positions at the hinge portions 23 and 24 as described above. The first frame member 21 and the second frame member 22 can separately pivot. There is a state change that a left side part 3PL of the display screen 3P (part on the left of the position 3F indicated by the dotted line) is pivoted in the portable device 1 when the first frame member 21 is pivoted. There is a state change that a right side part 3PR of the display screen 3P (part on the right of the position 3F indicated by the dotted line) is pivoted when the second frame member 22 is pivoted.

Configuration Example Inside Outer Casing 2 of Portable Device 1

Figure 2:
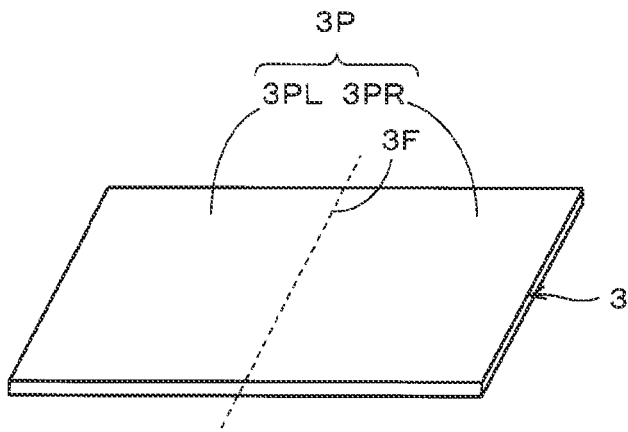
FIG. 2 is an exploded perspective view for describing a configuration example of parts in the example of the portable device as the first embodiment of the position detection device according to the disclosure.
Figure 2:
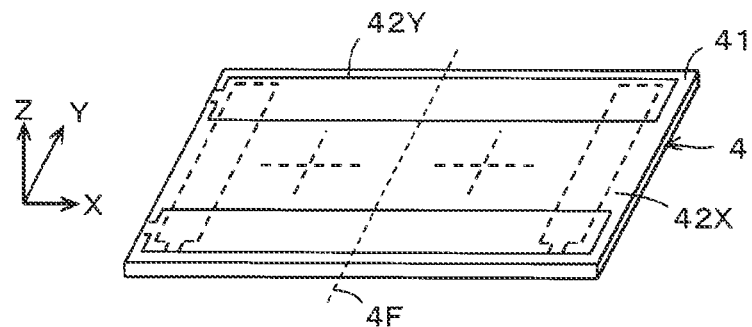
Figure 2:
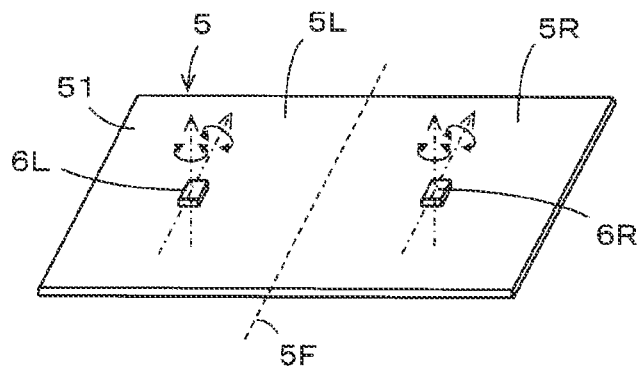

As described above, the flexible display element 3, the position detection sensor 4, and the electronic circuit unit connected to them are housed in the outer casing 2. FIG. 2 is an exploded configuration diagram for describing them.

The flexible display element 3 includes, for example, an organic EL display (organic electro luminescence display) element or an LCD (Liquid Crystal Display) and includes the display screen 3P including a large number of display pixels arrayed in an X-axis direction (horizontal direction) and a Y-axis direction (vertical direction).

The position detection sensor 4 of electromagnetic induction coupling type is arranged below the flexible display element 3 (on the opposite side of the display screen 3P), overlapping with the flexible display element 3.

The position detection sensor 4 includes an X-axis direction loop coil group 42X and a Y-axis direction loop coil group 42Y arranged on a flexible board 41, the X-axis direction loop coil group 42X including a plurality of loop coils in an X-axis direction that is a horizontal direction parallel to the surface of the board 41, the Y-axis direction loop coil group 42Y including a plurality of loop coils in a Y-axis direction that is a vertical direction. In the example of FIG. 2, the Y-axis direction loop coil group 42Y is arranged on a front surface side of the flexible board 41, and the X-axis direction loop coil group 42X is arranged on a back surface side. The position detection sensor 4 is, for example, attached and arranged on a surface on the opposite side of the display screen 3P of the flexible display element 3.

In the example, the display region of the display screen 3P of the flexible display element 3 and the position detection region of the position detection sensor 4 have substantially the same size as described above. The display screen 3P of the flexible display element 3 serves as an input surface of the position indicated by the electronic pen 10, and the position detection sensor 4 detects the position on the input surface indicated by the electronic pen 10.

In the position detection sensor 4, a position 4F indicated by a dotted line in FIG. 2 represents a bend position of the position detection sensor 4 corresponding to the bend position 3F of the flexible display element 3.

A circuit board 5 is arranged on a surface of the position detection sensor 4 on the opposite side of the surface (input surface) attached to the flexible display element 3. The circuit board 5 includes an electronic circuit unit (not illustrated) formed on a flexible board 51. The electronic circuit unit includes a position detection circuit connected to the position detection sensor 4 and configured to detect the position indicated by the electronic pen 10, a display control circuit that generates a display image to be displayed on the display screen 3P, and a process control circuit that executes a control process corresponding to the state change of the outer casing 2 as described later.

In the embodiment, the flexible display element 3, the position detection sensor 4, and the circuit board 5 are placed on top of each other and housed in the outer casing 2, and the first frame member 21 and the second frame member 22 can be pivoted to bend the flexible display element 3, the position detection sensor 4, and the circuit board 5 placed on top of each other. A position 5F indicated by a dotted line in FIG. 2 represents a bend position corresponding to the bend position 3F of the flexible display element 3 and the bend position 4F of the position detection sensor 4.

In the embodiment, gyro sensors 6L and 6R as an example of motion sensors that detect a movement (motion) of the outer casing 2 are provided on the circuit board 5. In this case, the two gyro sensors 6L and 6R are arranged in a state in which a pivotable displaceable flexible part, that is, the band-shaped part connecting the hinge portion 23 and the hinge portion 24, exists between the gyro sensors 6L and 6R.

In the embodiment, as illustrated in FIG. 2, the gyro sensor 6L is arranged at a predetermined position, substantially at the center in the example, of a part 5L on the left of the bend position 5F of the circuit board 5 in order to detect at least the movement of the part on the left side of the outer casing 2 caused by the pivoting of the first frame member 21. The gyro sensor 6R is arranged at a predetermined position, substantially at the center in the example, of a part 5R on the right of the bend position 5F of the circuit board 5 in order to detect at least the movement of the part on the right side of the outer casing 2 caused by the pivoting of the second frame member 22.

The gyro sensors 6L and 6R are 3-axis sensors in the example, and the gyro sensors 6L and 6R are arranged such that at least one axial direction is a direction parallel to the Y-axis direction that is a direction (vertical direction of the outer casing 2) parallel to the band-shaped part connecting the hinge portion 23 and the hinge portion 24 as indicated by a chain line in FIG. 2. As for the other two axial directions of the arranged gyro sensors 6L and 6R, one axial direction is parallel to the X-axis direction that is the horizontal direction of the outer casing 2, and the other axial direction is a direction parallel to the Z-axis direction (direction orthogonal to the surface of the board 41 of the position detection sensor 4). The gyro sensors 6L and 6R can detect pivot displacements, with the axial directions as the centers of pivot.

Note that the circuit board 5 may include a hard board including the part housed on the first frame member 21 side of the outer casing 2 and the part housed on the second frame member 22 side, and a flexible board that connects the hard board and the band-shaped part connecting the hinge portions 23 and 24. In this way, the circuit board 5 may be bendable at the flexible board part of the connection portion.

As described above, the two gyro sensors 6L and 6R in the portable device 1 of the first embodiment are arranged in a state in which the flexible part that can be flexibly displaced exists at least between the two gyro sensors 6L and 6R. Therefore, the two gyro sensors 6L and 6R can detect the state changes when the existence of the flexible part is used to change the outer casing 2 into a plurality of different types of states.

In the embodiment, the state changes of the outer casing 2 of the portable device 1 detected by the two gyro sensors 6L and 6R can be associated with start instructions of various process functions, such as an on/off instruction of power supply in the portable device 1, a page turning instruction of a display image, and a completion instruction of the input to the page in progress. In this way, power on/off, page turning, and the like can be performed in the portable device 1 without a button operation.

Electronic Circuit Configuration Example of Portable Device 1

Figure 3:
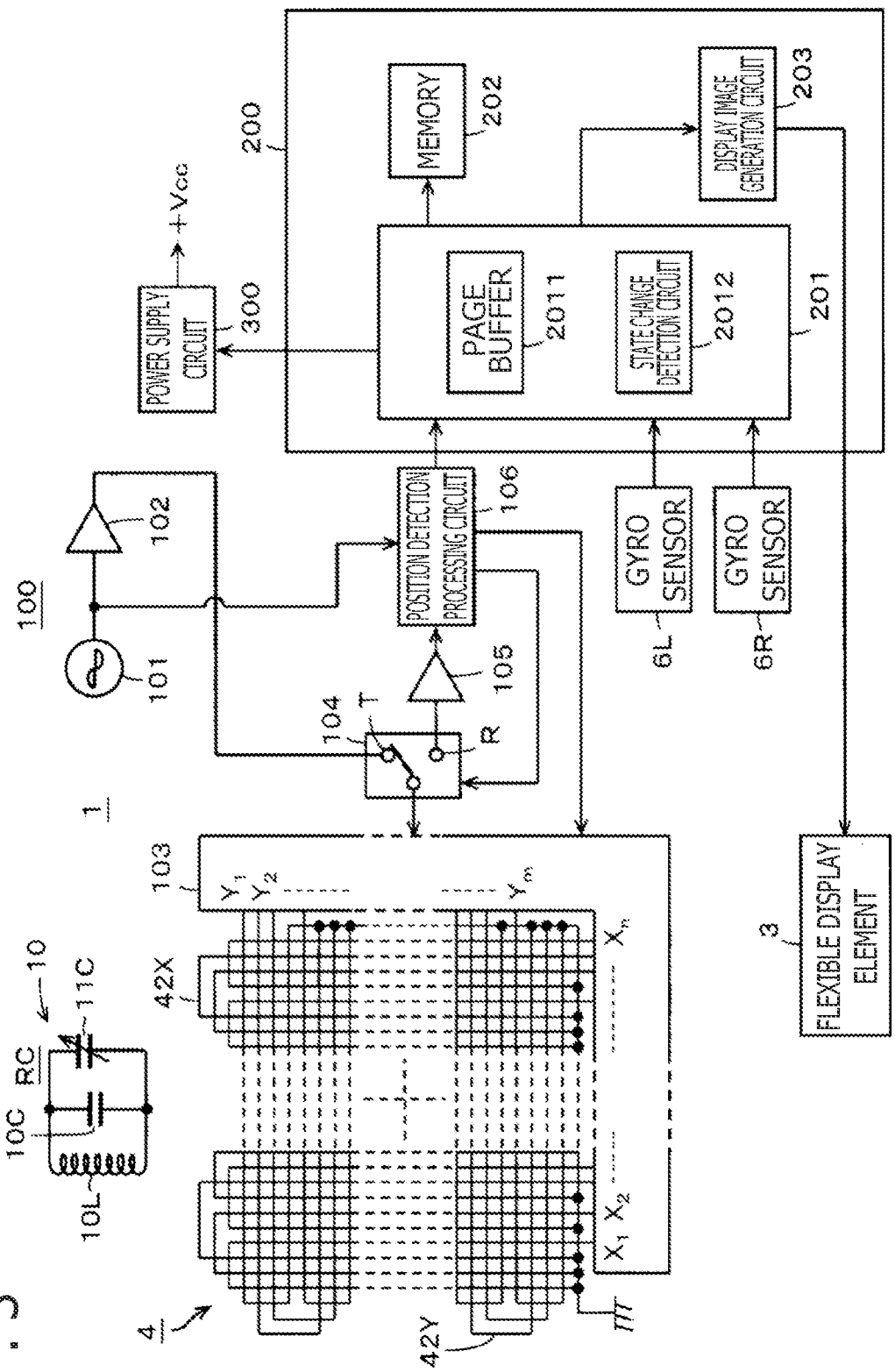
FIG. 3 is a block diagram illustrating a configuration example of an electronic circuit unit in the example of the portable device as the first embodiment of the position detection device according to the disclosure.

FIG. 3 depicts an electronic circuit configuration example of the portable device 1 of the embodiment. The circuit board 5 is provided with a position detection circuit 100, an operation information processing circuit 200, and a power supply circuit 300. As illustrated in FIG. 3, the position detection sensor 4 is connected to the position detection circuit 100. An output of the position detection circuit 100 is supplied to the operation information processing circuit 200. The power supply circuit 300 of the portable device 1 of the example includes, for example, a rechargeable battery as a power supply and supplies a power supply voltage to each component.

The operation information processing circuit 200 controls on/off of the power supply circuit 300 and saves writing input data based on the position instruction input by the electronic pen 10. The operation information processing circuit 200 further generates display image information of the writing input data in the example. The operation information processing circuit 200 supplies the display image information to the flexible display element 3 and causes the display screen 3P of the flexible display element 3 to display the display image information. Note that, in the portable device 1 of the example, the power supply circuit 300 supplies a power supply voltage to the gyro sensors 6L and 6R and part of the operation information processing circuit 200 to allow them to operate even when the power supply is turned off.

As illustrated in FIG. 3, the position detection sensor 4 in the example includes the X-axis direction loop coil group 42X and the Y-axis direction loop coil group 42Y on both the front surface and the back surface of the flexible board 41 as illustrated in FIG. 2. Each of loop coils $X_1$ to $X_n$ of the X-axis loop coil group 42X and loop coils $Y_1$ to $Y_m$ of the Y-axis loop coil group 42Y may have one turn or may have two or more turns. The numbers n and m of the loop coils of the loop coil groups 42X and 42Y may also be appropriate numbers corresponding to the size of the position detection sensor 4.

The position detection circuit 100 includes an oscillator 101, a current driver 102, a selection circuit 103, a switch connection circuit 104, a reception amplifier 105, and a position detection processing circuit 106. The loop coils of the loop coil groups 42X and 42Y of the position detection sensor 4 are connected to the selection circuit 103.

The position detection processing circuit 106 has a function of controlling the selection of the loop coils of the position detection sensor 4 in the selection circuit 103 and the switch of the switch connection circuit 104 and controlling the process timing of the detection of the position indicated by the electronic pen 10 and the detection of the pressure (pen pressure) applied to the pen tip of the electronic pen 10.

The X-axis direction loop coil group 42X and the Y-axis direction loop coil group 42Y of the position detection sensor 4 are connected to the selection circuit 103. The selection circuit 103 sequentially selects one loop coil of the two loop coil groups 42X and 42Y. The oscillator 101 generates an alternating current signal with a frequency f0. The oscillator 101 supplies the generated alternating current signal to the current driver 102. The current driver 102 converts the alternating current signal supplied from the oscillator 101 into an electric current and transmits the electric current to the switch connection circuit 104.

The switch connection circuit 104 switches a connection destination (transmission side terminal T or reception side terminal R) of the loop coil selected by the selection circuit 103 based on the control from the position detection processing circuit 106. The current driver 102 is connected to the transmission side terminal T of the connection destination, and the reception amplifier 105 is connected to the reception side terminal R. The switch connection circuit 104 is switched to the terminal T side when the position detection sensor 4 transmits a signal. On the other hand, the switch connection circuit 104 is switched to the terminal R side when the position detection sensor 4 receives a signal from the outside.

The current from the current driver 102 is supplied to the loop coil selected by the selection circuit 103 when the switch connection circuit 104 is switched to the terminal T side. As a result, a magnetic field is generated in the loop coil, and a signal (radio wave) to act on a resonant circuit of the electronic pen 10 on the input surface of the position detection sensor 4 is transmitted. The resonant circuit of the electronic pen 10 has a resonant frequency equal to the frequency f0 of the alternating current signal generated from the oscillator 101.

A configuration example of the electronic circuit of the electronic pen 10 is illustrated on the upper left of FIG. 3. The electronic pen 10 of the example includes a resonance circuit RC including a position indication coil 10L and a capacitor 10C. In the electronic pen 10 of the example, a variable capacitor 11C that handles the pen pressure applied to the pen tip as a change in capacitance and that includes a pen pressure detection unit is connected in parallel to the resonance circuit RC. The resonant frequency of the resonance circuit RC is changed by the capacitance corresponding to the pen pressure of the variable capacitor 11C.

After receiving the alternating current signal with the frequency f0 from the position detection sensor 4 through electromagnetic induction coupling, the resonance circuit RC of the electronic pen 10 feeds the received signal back to the position detection sensor 4 when the position detection sensor 4 enters a reception state. In this case, the frequency of the feedback signal from the resonance circuit RC changes according to the capacitance corresponding to the pen pressure detected by the variable capacitor 11C including the pen pressure detection unit.

The position detection processing circuit 106 connects the switch connection circuit 104 to the terminal T to transmit the alternating current signal with the frequency f0 to the resonance circuit RC of the electronic pen 10 through electromagnetic induction coupling and then switches the switch connection circuit 104 to the terminal R side.

Consequently, an induced voltage generated in the loop coil of the position detection sensor 4 due to the feedback signal from the resonance circuit RC of the electronic pen 10 is sent to the reception amplifier 105 through the selection circuit 103 and the switch connection circuit 104. The reception amplifier 105 amplifies the induced voltage supplied from the loop coil and transmits the voltage as a reception signal to the position detection processing circuit 106.

The position detection processing circuit 106 determines the loop coil selected at the time of the acquisition of the reception signal from the reception amplifier 105 to detect the coordinates of the indicated position on the position detection sensor 4 indicated by the electronic pen 10 that is the transmission source of the reception signal.

The position detection processing circuit 106 uses the transmission signal from the oscillator 101 to synchronously detect the reception signal to detect a frequency shift (phase difference) between them to thereby detect the pen pressure applied to the pen tip of the electronic pen 10. The position detection processing circuit 106 supplies the detected coordinate data of the position indicated by the electronic pen 10 and the detected pen pressure data to the operation information processing circuit 200.

The operation information processing circuit 200 includes a process control circuit 201, a memory 202, and a display image generation circuit 203 as illustrated in FIG. 3. The operation information processing circuit 200 may be a microprocessor unit including an external memory 202.

The process control circuit 201 of the operation information processing circuit 200 adds data of time of reception of the coordinate data and the pen pressure data received from the position detection processing circuit 106 to the coordinate data and the pen pressure data to generate writing input data that is time-series data along the flow of time. The position detection processing circuit 106 can also use a well-known method to detect the tilt angle of the electronic pen 10 with respect to the input surface. In that case, the information of the detected tilt angle is also included in the writing input data.

In the embodiment, the process control circuit 201 includes a page buffer 2011 that temporarily stores the writing input data corresponding to one screen of the display screen 3P and stores the generated writing input data in the page buffer 2011. The process control circuit 201 supplies the writing input data stored in the page buffer 2011 to the display image generation circuit 203.

The display image generation circuit 203 generates display image (writing trace image) information from the input writing input data and supplies the generated display image information to the flexible display element 3 to display a display image (writing trace image) on the display screen 3P.

The process control circuit 201 adds data of reception time of the detection output of the gyro sensors 6L and 6R to the detection output and stores it in the page buffer 2011. That is, information of the movement of the outer casing 2 is stored in the page buffer 2011 along with the writing input data in the embodiment. In this case, the data of time can be used to associate the writing input data with the detection output of the gyro sensors 6L and 6R. The writing input data and the detection output of the gyro sensors 6L and 6R associated with the data of time may be stored as one group of data in the page buffer 2011. The storage data of the page buffer 2011 is stored as data corresponding to one page in the memory 202.

The process control circuit 201 further includes a state change detection circuit 2012. The state change detection circuit 2012 analyzes the detection output of the two gyro sensors 6L and 6R to detect the state change of the outer casing 2 of the portable device 1. The process control circuit 201 in the embodiment determines operation conditions, such as posture and movement, of the portable device 1 at the time of the writing input operation on the portable device 1 performed by the user, on the basis of the analysis result of the state change detection circuit 2012 and detects the state change corresponding to a preset control instruction for the portable device 1.

That is, the process control circuit 201 determines operation conditions based on the analysis result of the state change detection circuit 2012, such as an operation condition in which the user holds the portable device 1 in hand and uses the electronic pen 10 to perform the writing input operation, an operation condition in which the user places the portable device 1 on a desk and uses the electronic pen 10 to perform the writing input operation, an operation condition in which the user holds the portable device 1 in hand while walking and uses the electronic pen 10 to perform the writing input operation, and an operation condition in which the user lying on back holds the portable device in the air and performs the writing input operation. In the embodiment, the process control circuit 201 supplies the determination result of the operation condition to the display image generation circuit 203 and causes the display screen 3P to display the image information indicating the operation condition in the determination result.

The state change of the outer casing 2 corresponding to the control instruction for the portable device 1 is preset in the portable device 1 of the embodiment. The process control circuit 201 determines the control instruction corresponding to the state change detected by the state change detection circuit 2012 and executes a process corresponding to the control instruction.

The state changes detected by the state change detection circuit 2012, the corresponding control instructions, and the processes executed by the process control circuit 201 will be described in detail later. Examples of the control instructions include an on/off control instruction of the power supply circuit 300, a page-by-page storage instruction of the writing input data, and a page turning instruction.

That is, the process of on/off control of the power supply circuit 300 executed by the process control circuit 201 is one of the processes executed by the process control circuit 201 according to the state changes. In addition, the process control circuit 201 adds page numbers to the writing input data stored in the page buffer 2011 according to the detection output of the state change detection circuit 2012 and stores the page-by-page writing input data in the memory 202 as described later. The process control circuit 201 also executes a process of reading the writing input data stored in the memory 202 on the basis of the page turning instruction and storing the writing input data in the page buffer 2011 of the process control circuit 201.

Examples of State Changes Detected by State Change Detection Circuit 2012 and Corresponding Control Instructions On/Off Instruction of Power Supply In the portable device 1 of the embodiment, the power supply is turned off in a state in which the outer casing 2 is folded as illustrated in FIG. 1B, and the power supply is turned on in a state in which the outer casing 2 is fully open as illustrated in FIG. 1A.

In the portable device 1 of the embodiment, the state changes of the portable device 1 (outer casing 2) based on pivoting are detected, with the positions of the hinge portions 23 and 24 of the first frame member 21 and the second frame member 22 as centers of pivot. The detection results of the state changes are determined to be on-instructions and off-instructions of the power supply. The on/off control of the power supply to the portable device 1 is automatically performed.

That is, when the state is changed from the state in which the outer casing 2 is folded and the power supply is off as illustrated in FIG. 4A to the state in which the outer casing 2 is fully open as illustrated FIG. 4B, the state change is detected as a power supply on-instruction, and the power supply of the portable device 1 is turned on. In this case, examples of the state change from the folded state to the fully open state include three state changes including a state change in which only the first frame member 21 is pivoted 180 degrees counterclockwise, a state change in which only the second frame member 22 is pivoted 180 degrees in the clockwise direction, and a state change in which the first frame member 21 is pivoted in the counterclockwise direction and the second frame member 22 is pivoted clockwise.

In this case, the pivot displacement (pivot angle) of the first frame member 21 in the counterclockwise direction is detected as a pivot displacement (pivot angle) of the gyro sensor 6L about the Y-axis in the counterclockwise direction, and the pivot displacement (pivot angle) of the second frame member 22 in the clockwise direction is detected as a pivot displacement (pivot angle) of the gyro sensor 6R about the Y-axis in the clockwise direction. The three state changes in the embodiment are detected on the basis of whether or not the sum of the counterclockwise pivot angle about the Y-axis detected by the gyro sensor 6L and the clockwise pivot angle about the Y-axis detected by the gyro sensor 6R has become 180 degrees.

Although the power supply is turned on when the outer casing 2 is changed from the folded state to the fully open state in the description above, the state change may be detected as a power supply on-instruction when the outer casing 2 is opened 90 degrees or more from the folded state. In this case, the power supply is turned on when the sum of the counterclockwise pivot angle about the Y-axis detected by the gyro sensor 6L and the clockwise pivot angle about the Y-axis detected by the gyro sensor 6R becomes 90 degrees or more.

When the state is changed from the state in which the outer casing 2 is fully open and the power supply is on as illustrated in FIG. 4C to the state in which the outer casing 2 is folded as illustrated in FIG. 4D, the state change is detected as a power supply off-instruction, and the power supply of the portable device 1 is turned off. In this case, examples of changing the state from the fully open state to the folded state include three state changes including a state change in which only the first frame member 21 is pivoted 180 degrees clockwise, a state change in which only the second frame member 22 is pivoted 180 degrees in the counterclockwise direction, and a state change in which the first frame member 21 is pivoted in the clockwise direction and the second frame member 22 is pivoted counterclockwise.

In this case, the pivot displacement (pivot angle) of the first frame member 21 in the clockwise direction is detected as a pivot displacement (pivot angle) of the gyro sensor 6L about the Y-axis in the clockwise direction, and the pivot displacement (pivot angle) of the second frame member 22 in the counterclockwise direction is detected as a pivot displacement (pivot angle) of the gyro sensor 6R about the Y-axis in the counterclockwise direction. The three state changes can be detected on the basis of whether or not the sum of the clockwise pivot angle about the Y-axis detected by the gyro sensor 6L and the counterclockwise pivot angle about the Y-axis detected by the gyro sensor 6R has become 180 degrees.

Although the power supply is turned off when the outer casing 2 is changed from the fully open state to the folded state in the description above, the state change may be detected as a power supply off-instruction when the outer casing 2 is closed 90 degrees or more from the fully open state. In this case, the power supply is turned off when the sum of the clockwise pivot angle about the Y-axis detected by the gyro sensor 6L and the counterclockwise pivot angle about the Y-axis detected by the gyro sensor 6R becomes 90 degrees or more.

Clear (Page Clear) Instruction of Displayed Writing Trace Image

In the portable device 1, the user may desire to clear a writing trace image (hereinafter, referred to as page clear) written by then, which is stored in the page buffer 2011 of the process control circuit 201 of the operation information processing circuit 200 and is displayed on the display screen 3P, and newly input an image in a writing input mode for inputting characters or drawing a picture using the electronic pen 10. In that case, it would be convenient to delete at once the writing trace displayed on the display screen 3P instead of tracing and deleting the input writing trace part.

In the portable device 1 of the embodiment, the state change of the outer casing 2 is detected as a page clear instruction when the user performs a shaking operation of shaking the outer casing 2 of the portable device 1 in a direction parallel to the surface of the display screen 3P in a state in which the outer casing 2 is fully open, the power supply is on, and the writing input mode is selected as illustrated in FIG. 4E.

The process control circuit 201 of the operation information processing circuit 200 deletes and clears the writing input data input by then and stored in the page buffer 2011 when the state change detection circuit 2012 detects the state change of the shaking operation that is a page clear instruction. In this case, the shaking operation may be an operation of shaking the outer casing 2 once in the direction parallel to the surface of the display screen 3P, but an operation of shaking the outer casing 2 twice or more may be allocated for the shaking operation to reduce false detections.

The state change of the shaking operation in this case is detected as a pivot displacement of the two gyro sensors 6L and 6R about the Z-axis in the same direction (see ZL and ZR in FIG. 4E). That is, the two gyro sensors 6L and 6R detect the pivot displacement (rotation angle) about the Z-axis in the same direction when the shaking operation is performed while the outer casing 2 is fully open, and the shaking operation can be detected.

Note that, as illustrated in FIG. 4F, the pivot displacement of the two gyro sensors 6L and 6R about the Z-axis is in opposite directions (see ZL and ZR in FIG. 4F) when the shaking operation is performed while the portable device 1 is folded. Therefore, the pivot directions of the two gyro sensors 6L and 6R about the Z-axis are detected, and the pivot displacement (pivot angle) is handled as a clear instruction when the pivot directions are the same direction. In this way, the state change of the shaking operation while the outer casing 2 is fully open can be detected and distinguished from the state change of the shaking operation while the outer casing 2 is folded.

Note that, in the embodiment, the power supply is off in a state in which the outer casing 2 is folded as illustrated in FIG. 4F. Therefore, the state change of the shaking operation may be detected as a clear instruction when the power supply is on, without the detection of the rotation directions of the gyro sensors 6L and 6R about the Z-axis in the shaking operation.

The pivot angle of the shaking operation in this case is equal to or greater than a pivot angle of predetermined size, such as a pivot angle of equal to or greater than 30 degrees. This is for preventing a pivot displacement of a pivot angle equal to or smaller than the predetermined size from being falsely detected as a clear instruction.

Although the page may be cleared on the basis of only the state change of the shaking operation in the clear instruction through the shaking operation, an inquiry message "Clear the page?" may be displayed on the display screen 3P, and two icon buttons "YES" and "NO" may be displayed when the state change of the shaking operation is detected. The page may be cleared when the icon button "YES" is indicated by the electronic pen 10, and the clearing process may be stopped when the icon button "NO" is indicated by the electronic pen 10.

Page Turning (Next Page) Instruction: Including Change to New Page

Figure 5A:
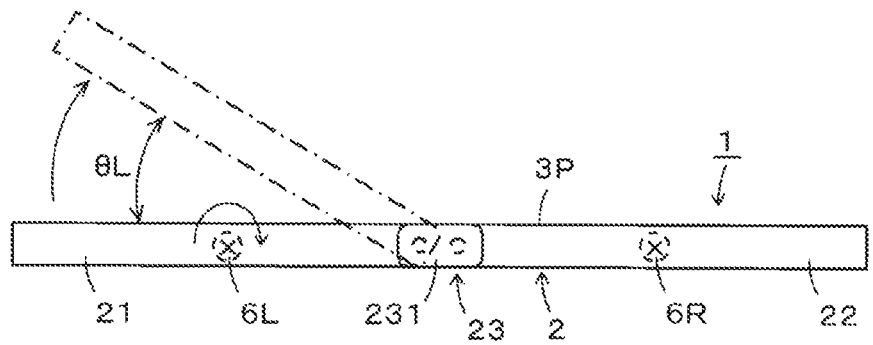
FIGS. 5A to 5C are diagrams used for describing an operation of the parts in the example of the portable device as the first embodiment of the position detection device according to the disclosure.

In the portable device 1 of the embodiment, the state change of the outer casing 2 is detected as an instruction of page turning (next page) when the user pivots only the first frame member 21 of the outer casing 2 by equal to or greater than a predetermined pivot angle and then pauses or reverses the pivoting as indicated by a chain line in FIG. 5A in a state in which the outer casing 2 is fully open, the power supply is on, and the writing input mode is selected as illustrated in FIG. 5A.

The process control circuit 201 of the operation information processing circuit 200 writes and saves, in the memory 202, the writing input data of the currently displayed page stored by then in the page buffer 2011 and reads the writing input data of the next page of the currently displayed page from the memory 202 and stores the writing input data in the page buffer 2011 when the state change detection circuit 2012 detects the state change of the page turning (next page). Subsequently, the process control circuit 201 receives an input written by the electronic pen 10 and writes the writing input data of the page to the page buffer 2011.

The state change detection circuit 2012 detects a pivot displacement of the gyro sensor 6L about the Y-axis in the clockwise direction by equal to or greater than a predetermined pivot angle and a pivot displacement of pausing or reversing after the pivoting by the pivot angle to thereby detect the state change of the page turning (next page). In this case, an example of the predetermined pivot angle includes 30 degrees.

When the next page of the page displayed on the display screen 3P is not stored in the memory 202 of the operation information processing circuit 200 of the portable device 1, a page number is added to the currently displayed writing input data of the page buffer 2011 if the page number is not added, and the writing input data is stored in the memory 202. The storage data of the page buffer 2011 is deleted to provide a new page (blank page).

Page Turning (Previous Page) Instruction

Figure 5B:
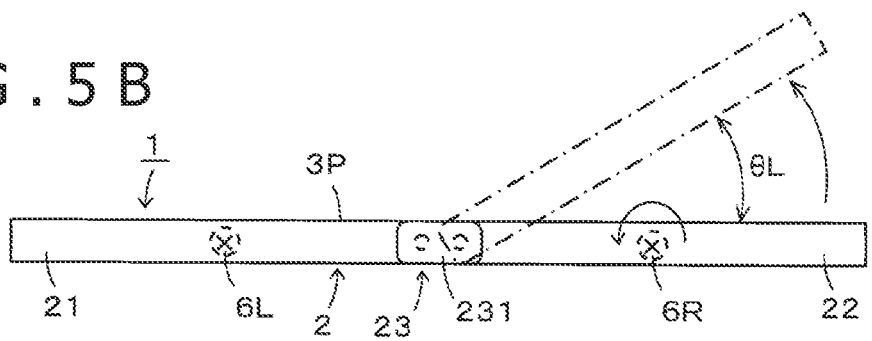

In the portable device 1 of the embodiment, the state change of the outer casing 2 is detected as an instruction of page turning (previous page) when the user pivots only the second frame member 22 of the outer casing 2 by equal to or greater than a pivot angle and then pauses or reverses the pivoting as indicated by a chain line in FIG. 5B in a state in which the outer casing 2 is fully open, the power supply is on, and the writing input mode is selected as illustrated in FIG. 5B.

The process control circuit 201 of the operation information processing circuit 200 writes and saves the currently displayed writing input data of the page buffer 2011 in the memory 202 and then reads the writing input data of the previous page of the currently displayed page from the memory 202 and stores the writing input data in the page buffer 2011 when the state change detection circuit 2012 detects the state change of the page turning (previous page). Subsequently, the process control circuit 201 receives an input written by the electronic pen 10 and stores the writing input in the page buffer 2011 to update the writing input data of the page.

The state change detection circuit 2012 detects a pivot displacement of the gyro sensor 6R about the Y-axis in the counterclockwise direction by equal to or greater than a predetermined pivot angle and a pivot displacement of pausing or reversing after the pivoting by the pivot angle to thereby detect the state change of the page turning (previous page). In this case, an example of the predetermined pivot angle includes 30 degrees.

When the previous page of the page displayed on the display screen 3P is not stored in the memory 202 of the operation information processing circuit 200 of the portable device 1, the process control circuit 201 causes the display image generation circuit 203 to generate a message "There is no previous page." and displays the message on the display screen 3P to alert the user.

Page-by-Page Storage Instruction

Figure 5C:
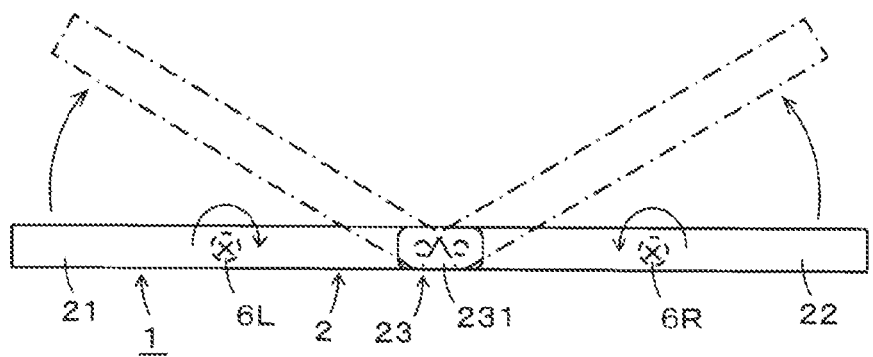

In the portable device 1 of the embodiment, the state change of the outer casing 2 is detected as a page-by-page storage instruction when the user pivots both the first frame member 21 and the second frame member 22 of the outer casing 2 at the same time by equal to or greater than a predetermined pivot angle, such as 30 degrees or more, and then pauses or reverses the pivoting as indicated by a chain line in FIG. 5C in a state in which the outer casing 2 is fully open, the power supply is on, and the writing input mode is selected as illustrated in FIG. 5C.

The process control circuit 201 of the operation information processing circuit 200 stores the writing input data in the memory 202 after adding a page number to the writing input data stored in the page buffer 2011 by then if the page number is not added or after overwriting the writing input data of the same page if the page number is added, when the state change detection circuit 2012 detects the state change of the page-by-page storage instruction. In this case, the writing input data stored in the page buffer is held as it is.

That is, the state change of the page-by-page storage instruction is performed when the user desires to save, in the memory 202, the writing input data of the writing trace image displayed on the display screen 3P. As a result of the execution of the page-by-page storage instruction, the writing input data of the page (displayed page) written and input by that time is appropriately stored as writing input data of the page in the memory 202.

Operation Example of Process Control Circuit 201 of Operation Information Processing Circuit 200

An operation example of the process control circuit 201 of the operation information processing circuit 200 will be described with reference to a flow chart of FIGS. 6 to 9.

Figure 6:
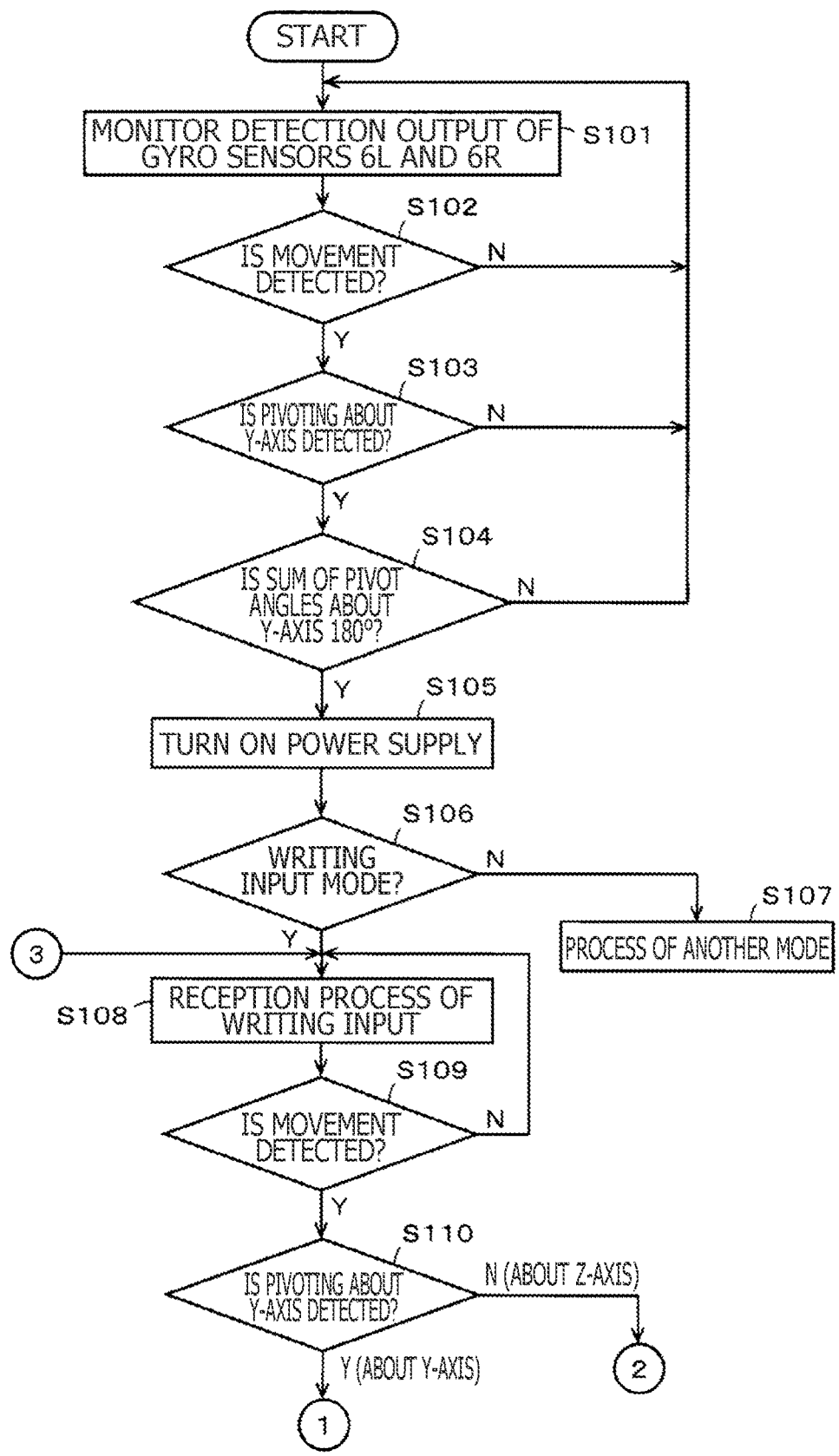
FIG. 6 depicts part of a flow chart for describing a flow of the operation of the parts in the example of the portable device as the first embodiment of the position detection device according to the disclosure.

In the portable device 1 of the embodiment, the operation begins from the start of FIG. 6 in a state in which the outer casing 2 is folded, and the power supply is off. As also described above, the power supply voltage is supplied to the process control circuit 201 of the operation information processing circuit 200 even when the power supply is off, and the process control circuit 201 is in the operating state. The process control circuit 201 executes the operation of each act in the flow chart of FIGS. 6 to 9 in the following description.

The process control circuit 201 monitors the detection output of the gyro sensors 6L and 6R (S101) and determines whether or not a movement of the outer casing 2 is detected (S102). If the process control circuit 201 determines that the movement of the outer casing 2 is not detected at S102, the process control circuit 201 returns the process to S101 and repeats the process from S101.

If the process control circuit 201 determines that the movement of the outer casing 2 is detected at S102, the process control circuit 201 determines whether or not pivoting about the Y-axis is detected (S103). If the process control circuit 201 determines that the pivoting about the Y-axis is not detected at S103, the process control circuit 201 returns the process to S101 and repeats the process from S101.

If the process control circuit 201 determines that the pivoting about the Y-axis is detected at S103, the process control circuit 201 determines whether or not the sum of the pivot angles about the Y-axis detected by the gyro sensors 6L and 6R is 180 degrees (S104). If the process control circuit 201 determines that the sum of the detected pivot angles about the Y-axis is not 180 degrees at S104, the process control circuit 201 returns the process to S101 and repeats the process from S101.

If the process control circuit 201 determines that the sum of the detected pivot angles about the Y-axis is 180 degrees at S104, the process control circuit 201 determines that the state of the outer casing 2 is changed from the folded state to the fully open state so that the power supply on-instruction is performed and controls the power supply circuit 300 to change the power supply circuit 300 from the power supply off state to the power supply on state (S105).

The process control circuit 201 determines whether or not the portable device 1 is in the writing input mode with the electronic pen 10 (S106). If the process control circuit 201 determines that the portable device 1 is not in the writing input mode at S106, the process control circuit 201 shifts the process to a processing routine for executing another process (S107). Note that a process for the power supply off-instruction described later is also similarly executed in the processing routine of another process at S107.

If the process control circuit 201 determines that the portable device 1 is in the writing input mode at S106, the process control circuit 201 receives an input written by the electronic pen 10, writes the received writing input data to the page buffer 2011, and controls the display screen 3P to display the writing trace image based on the writing input data (S108).

The process control circuit 201 monitors the detection output of the gyro sensors 6L and 6R and determines whether or not a movement of the outer casing 2 is detected (S109). If the process control circuit 201 determines that the movement is not detected, the process control circuit 201 returns the process to S108 and repeats the process from S108.

If the process control circuit 201 determines that the movement is detected at S109, the process control circuit 201 determines whether or not pivoting about the Y-axis is detected (S110).

Figure 7:
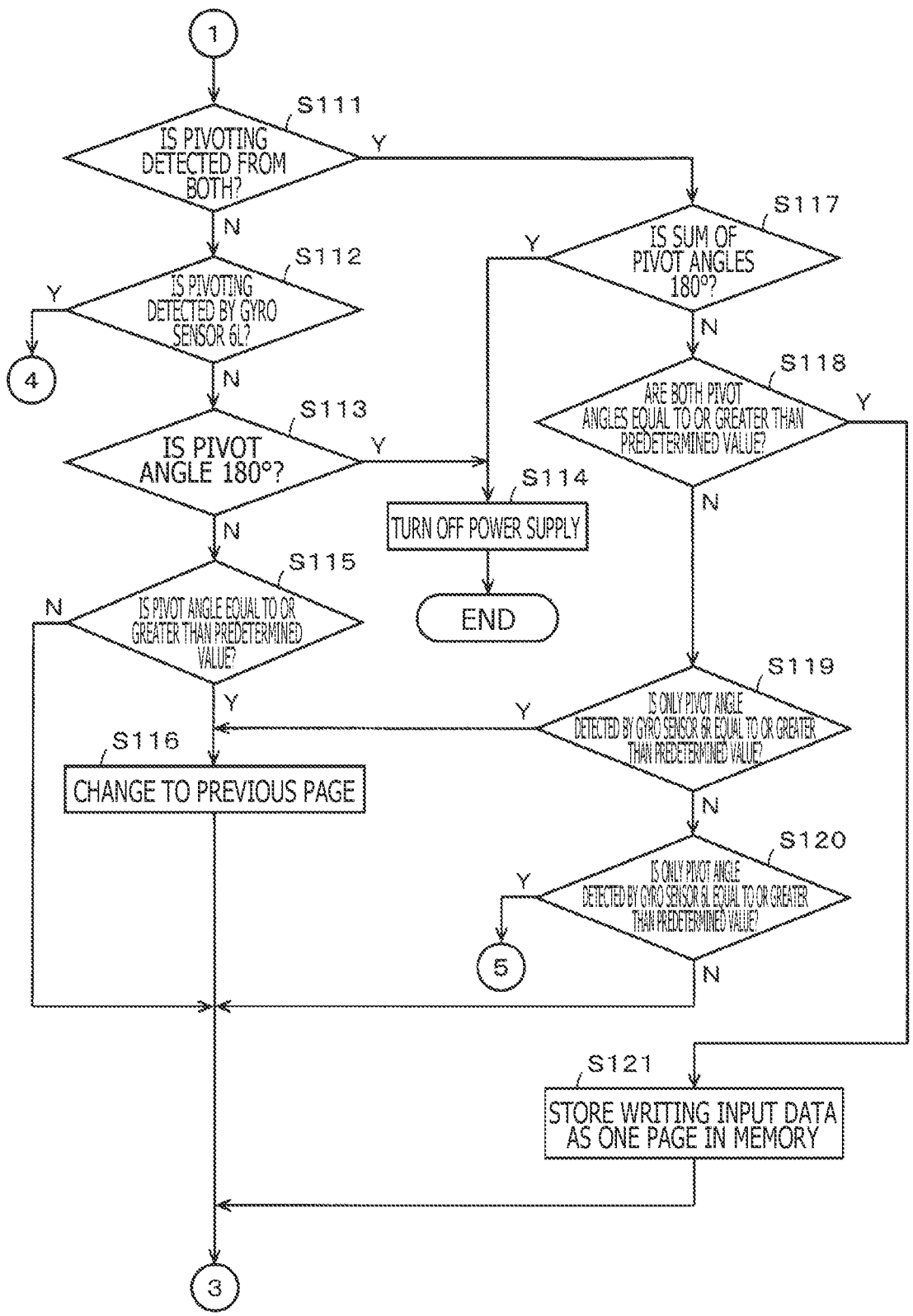
FIG. 7 depicts part of the flow chart for describing the flow of the operation of the parts in the example of the portable device as the first embodiment of the position detection device according to the disclosure.
Figure 8:
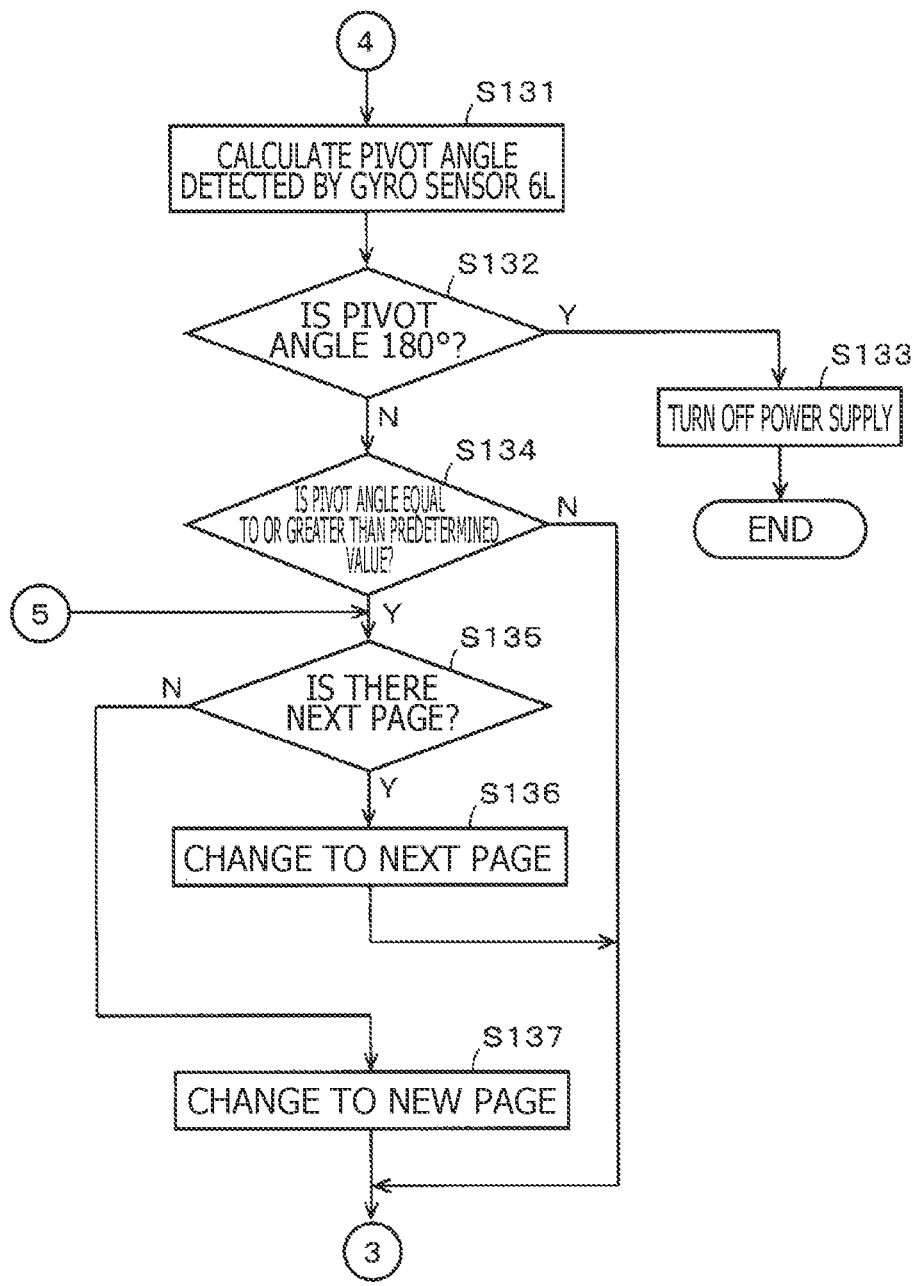
FIG. 8 depicts part of the flow chart for describing the flow of the operation of the parts in the example of the portable device as the first embodiment of the position detection device according to the disclosure.

If the process control circuit 201 determines that the pivoting about the Y-axis is detected at S110, the process control circuit 201 determines whether or not the pivoting about the Y-axis is detected from both of the gyro sensors 6L and 6R (S111 of FIG. 7).

If the process control circuit 201 determines that the pivoting about the Y-axis is not detected from both of the gyro sensors 6L and 6R at S111, the process control circuit 201 determines whether or not the pivoting about the Y-axis is detected by only the gyro sensor 6L (S112).

If the process control circuit 201 determines that the pivoting about the Y-axis is detected by the gyro sensor 6R instead of the gyro sensor 6L at S112, the process control circuit 201 determines whether or not the detected pivot angle is 180 degrees (S113).

If the process control circuit 201 determines that the pivot angle detected by the gyro sensor 6R is 180 degrees at S113, the process control circuit 201 determines that the state of the outer casing 2 is changed from the fully open state to the folded state and controls the power supply circuit 300 to change the power supply circuit 300 from the power supply on state to the power supply off state (S114). The process control circuit 201 ends the processing routine.

If the process control circuit 201 determines that the pivot angle detected by the gyro sensor 6R is not 180 degrees at S113, the process control circuit 201 determines that the detected pivot angle is equal to or smaller than 180 degrees because the outer casing 2 of the portable device 1 of the embodiment can be pivoted only up to 180 degrees and determines whether or not the pivot angle is equal to or greater than a predetermined pivot angle such as 30 degrees (S115).

If the process control circuit 201 determines that the pivot angle detected by the gyro sensor 6R is equal to or greater than 30 degrees that is the predetermined pivot angle and equal to or smaller than 180 degrees at S115, the process control circuit 201 determines that the second frame member 22 of the outer casing 2 is pivoted as illustrated in FIG. 5B, the state of the outer casing 2 is changed, and the page turning (previous page) instruction is performed. The process control circuit 201 executes the control process corresponding to the page turning (previous page) instruction (S116). That is, the process control circuit 201 at S116 adds the page number to the writing input data of the displayed page stored in the page buffer 2011 if the page number is not added, saves the writing input data in the memory 202, reads the writing input data of the previous page from the memory 202, writes the writing input data to the page buffer 2011, and controls the display screen 3P to display the writing trace image based on the writing input data.

After S116, the process control circuit 201 returns the process to S108 and repeats the process from S108. If the process control circuit 201 determines that the pivot angle detected by the gyro sensor 6R is smaller than 30 degrees that is the predetermined pivot angle at S115, the process control circuit 201 ignores the pivoting of the second frame member 22, returns the process to S108, and repeats the process from S108.

If the process control circuit 201 determines that the pivoting about the Y-axis is detected by the gyro sensor 6L in S112, the process control circuit 201 calculates the pivot angle about the Y-axis detected by the gyro sensor 6L (S131 of FIG. 8) and determines whether or not the calculated pivot angle is 180 degrees (S132).

If the process control circuit 201 determines that the pivot angle detected by the gyro sensor 6L is 180 degrees at S132, the process control circuit 201 determines that the state of the outer casing 2 is changed from the fully open state to the folded state and controls the power supply circuit 300 to change the power supply circuit 300 from the power supply on state to the power supply off state (S133). The process control circuit 201 ends the processing routine.

If the process control circuit 201 determines that the pivot angle detected by the gyro sensor 6L is not 180 degrees at S132, the process control circuit 201 determines that the detected pivot angle is equal to or smaller than 180 degrees and determines whether or not the pivot angle is equal to or greater than a predetermined pivot angle such as 30 degrees (S134).

If the process control circuit 201 determines that the pivot angle detected by the gyro sensor 6L is equal to or greater than 30 degrees that is the predetermined pivot angle and equal to or smaller than 180 degrees at S134, the process control circuit 201 determines that the first frame member 21 of the outer casing 2 is pivoted as illustrated in FIG. 5A, and the state of the outer casing 2 is changed. The process control circuit 201 determines that the page turning (next page) instruction is performed and executes the control process corresponding to the page turning (next page) instruction.

That is, the process control circuit 201 determines whether or not the writing input data of the next page of the display page is stored in the memory 202 (S135). If the process control circuit 201 determines that the writing input data of the next page is stored in the memory 202, the process control circuit 201 saves, in the memory 202, the writing input data of the displayed page stored in the page buffer 2011, reads the writing input data of the next page from the memory 202, writes the writing input data to the page buffer 2011, and controls the display screen 3P to display the writing trace image based on the writing input data (S136).

If the process control circuit 201 determines that the writing input data of the next page is not stored in the memory 202 at S135, the process control circuit 201 adds the page number to the writing input data of the displayed page stored in the page buffer 2011 if the page number is not added, saves the writing input data in the memory 202, clears the writing input data of the page buffer, and clears the writing trace image displayed on the display screen 3P to change the page to a new page (S137).

After S136 or S137, the process control circuit 201 returns the process to S108 and repeats the process from S108. If the process control circuit 201 determines that the pivot angle detected by the gyro sensor 6L is smaller than 30 degrees that is the predetermined pivot angle at S134, the process control circuit 201 ignores the pivoting of the first frame member 21, returns the process to S108, and repeats the process from S108.

If the process control circuit 201 determines that the pivoting about the Y-axis is detected from both of the gyro sensors 6L and 6R at S111 of FIG. 7, the process control circuit 201 determines whether or not the sum of the pivot angles about the Y-axis detected by the two gyro sensors 6L and 6R is 180 degrees (S117).

If the process control circuit 201 determines that the sum of the pivot angles about the Y-axis detected by the two gyro sensors 6L and 6R is 180 degrees at S117, the process control circuit 201 determines that the state of the outer casing 2 is changed from the fully open state to the folded state, advances the process to S114, and controls the power supply circuit 300 to change the power supply circuit 300 from the power supply on state to the power supply off state.

If the process control circuit 201 determines that the sum of the pivot angles about the Y-axis detected by the two gyro sensors 6L and 6R is smaller than 180 degrees instead of 180 degrees at S117, the process control circuit 201 determines whether or not both of the pivot angles about the Y-axis detected by the two gyro sensors 6L and 6R are equal to or greater than a predetermined pivot angle, 30 degrees in the example (S118).

If the process control circuit 201 determines that both of the pivot angles about the Y-axis detected by the two gyro sensors 6L and 6R are not equal to or greater than the predetermined pivot angle, 30 degrees in the example, at S118, the process control circuit 201 determines whether or not only the pivot angle detected by the gyro sensor 6R is equal to or greater than the predetermined pivot angle, 30 degrees in the example (S119).

If the process control circuit 201 determines that only the pivot angle detected by the gyro sensor 6R is equal to or greater than the predetermined pivot angle, 30 degrees in the example, at S119, the process control circuit 201 determines that the second frame member 22 of the outer casing 2 is pivoted as illustrated in FIG. 5B, the state of the outer casing 2 is changed, and the page turning (previous page) instruction is performed. The process control circuit 201 advances the process to S116 and executes the process from S116.

If the process control circuit 201 determines that the pivot angle detected by the gyro sensor 6R is not equal to or greater than the predetermined pivot angle, 30 degrees in the example, at S119, the process control circuit 201 determines whether or not only the pivot angle detected by the gyro sensor 6L is equal to or greater than the predetermined pivot angle, 30 degrees in the example (S120).

If the process control circuit 201 determines that only the pivot angle detected by the gyro sensor 6L is equal to or greater than the predetermined pivot angle, 30 degrees in the example, at S120, the process control circuit 201 determines that the first frame member 21 of the outer casing 2 is pivoted as illustrated in FIG. 5A, the state of the outer casing 2 is changed, and the page turning (next page) instruction is performed. The process control circuit 201 advances the process to S135 of FIG. 8 and executes the process from S135.

If the process control circuit 201 determines that the pivot angle detected by the gyro sensor 6L is not equal to or greater than the predetermined pivot angle, 30 degrees in the example, at S120, the process control circuit 201 ignores the movement detected by the gyro sensors 6L and 6R, returns the process to S108 of FIG. 6, and repeats the process after S108.

If the process control circuit 201 determines that both of the pivot angles about the Y-axis detected by the two gyro sensors 6L and 6R are equal to or greater than the predetermined angle, 30 degrees in the example, at S118, the process control circuit 201 determines that the state of the outer casing 2 is changed from the fully open state to the state in which both the first frame member 21 and the second frame member 22 are pivoted by equal to or greater than the predetermined pivot angle, 30 degrees in the example, at the same time as illustrated in FIG. 5C. The process control circuit 201 determines that the page-by-page storage instruction is performed and executes the control process corresponding to the page-by-page storage instruction (S121).

That is, the process control circuit 201, at S121, stores, in the memory 202, the writing input data stored in the page buffer 2011 by then after adding the page number to the writing input data if the page number is not added or after overwriting the writing input data of the same page if the page number is added. In this case, the writing input data stored in the page buffer 2011 is held as it is, and the display image of the display screen 3P is also maintained. After S121, the process control circuit 201 returns the process to S108 and repeats the process from S108.

Figure 9:
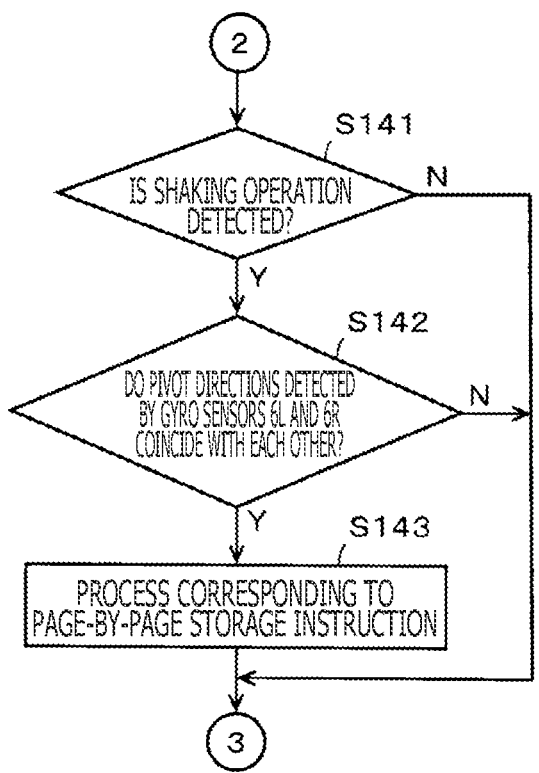
FIG. 9 depicts part of the flow chart for describing the flow of the operation of the parts in the example of the portable device as the first embodiment of the position detection device according to the disclosure.

If the process control circuit 201 determines that pivoting about the Z-axis is detected instead of the pivoting about the Y-axis at S110 of FIG. 6, the process control circuit 201 determines whether or not the pivoting is a shaking operation in which the pivot angle about the Z-axis is equal to or greater than a predetermined pivot angle, 30 degrees in the example (S141 of FIG. 9).

If the process control circuit 201 determines that the pivoting is the shaking operation at S141, the process control circuit 201 determines whether or not the pivot directions about the Z-axis detected by the two gyro sensors 6L and 6R coincide with each other (S142). If the process control circuit 201 determines that the pivot directions about the Z-axis detected by the two gyro sensors 6L and 6R coincide with each other at S142, the process control circuit 201 determines that the determined state change of the shaking operation is a page-by-page storage instruction and executes the control process corresponding to the page-by-page storage instruction (S143).

At S143, the process control circuit 201 deletes and clears the writing input data input by then and stored in the page buffer 2011. In this case, the storage data of the page buffer 2011 is eliminated, and the writing trace image displayed on the display screen 3P also disappears.

After S143, the process control circuit 201 returns the process to S108 and repeats the process from S108. The process control circuit 201 also returns the process to S108 and repeats the process from S108 if the process control circuit 201 determines that the pivoting is not the shaking operation at S141 or if the process control circuit 201 determines that the pivot directions about the Z-axis detected by the two gyro sensors 6L and 6R are opposite directions and do not coincide with each other in S142.

In this way, the portable device 1 of the embodiment includes the flexibly displaceable part that is the band-shaped part connecting the hinge portion 23 and the hinge portion 24. The outer casing 2 has a foldable structure, and the two gyro sensors 6L and 6R are provided at positions across the flexibly displaceable part. The portable device 1 can use the detection output of one or both of the two gyro sensors 6L and 6R to detect various state changes of the outer casing 2.

In the portable device 1 of the embodiment, the control instructions in the portable device 1 are allocated and associated with various state changes of the outer casing 2 that can be detected by using the detection output of one or both of the two gyro sensors 6L and 6R. In this way, various processes for the portable device 1 can be executed without the need of a button operation.

In the portable device 1 of the embodiment, the writing input data and the detection output of the gyro sensors 6L and 6R are associated by time and stored in the memory 202. Therefore, the writing input can be associated with the state change of the outer casing.

There is also an advantageous effect that not only the state changes of the outer casing, but also the operation conditions that are conditions of the portable device 1 during the writing input operation can be determined from the movement detection output of the gyro sensors 6L and 6R.

For example, operation conditions, such as an operation condition of using the portable device 1 while walking at a predetermined speed and an operation condition of a posture of holding the portable device 1 in the air and using the portable device 1 while lying on back, can be determined, and the operation conditions can be associated with the writing input data. Therefore, the posture and the operation condition of the user during the writing input can be determined.

Modification of First Embodiment

Although the two gyro sensors 6L and 6R are arranged at substantially the center positions of the first frame member 21 and the second frame member 22 of the outer casing 2, respectively, the two gyro sensors 6L and 6R do not have to be arranged at the center positions. The gyro sensors 6L and 6R may be provided at, for example, corners (edges) or peripheries of the first frame member 21 and the second frame member 22. It is only necessary to arrange the two gyro sensors 6L and 6R at two positions across the band-shaped part connecting the hinge portion 23 and the hinge portion 24 that are the flexibly displaceable part.

Although the gyro sensors 6L and 6R are 3-axis sensors in the embodiment, the gyro sensors 6L and 6R may be any multi-axis sensors with three or more axes as long as the direction of at least one axis is parallel to the Y-axis direction. In addition, the gyro sensors 6L and 6R may be 1-axis sensors or 2-axis sensors in which the direction of one axis is parallel to the Y-axis direction.

Although one gyro sensor is arranged on each of the first frame member 21 and the second frame member 22 in the above embodiment, a plurality of gyro sensors may be arranged on each of the first frame member 21 and the second frame member 22.

Second Embodiment

In the first embodiment, the display element 3 including the flexibly displaceable member, the position detection sensor 4, and the circuit board 5 are housed in the hard outer casing 2 for protection. The outer casing 2 includes the first frame member 21 and the second frame member 22, and the outer casing 2 is foldable. However, if the outer casing includes a flexibly displaceable protection member instead of the hard member, the position detection device can be flexibly displaced at an optional position. This increases the degree of freedom in arrangement position of a plurality of motion sensors.

Although the position detection device is a portable device as an independent device that can complete the process in the example of the first embodiment, there is also a case in which the position detection device is used as an input device of an information processing apparatus such as a personal computer.

Figure 10:
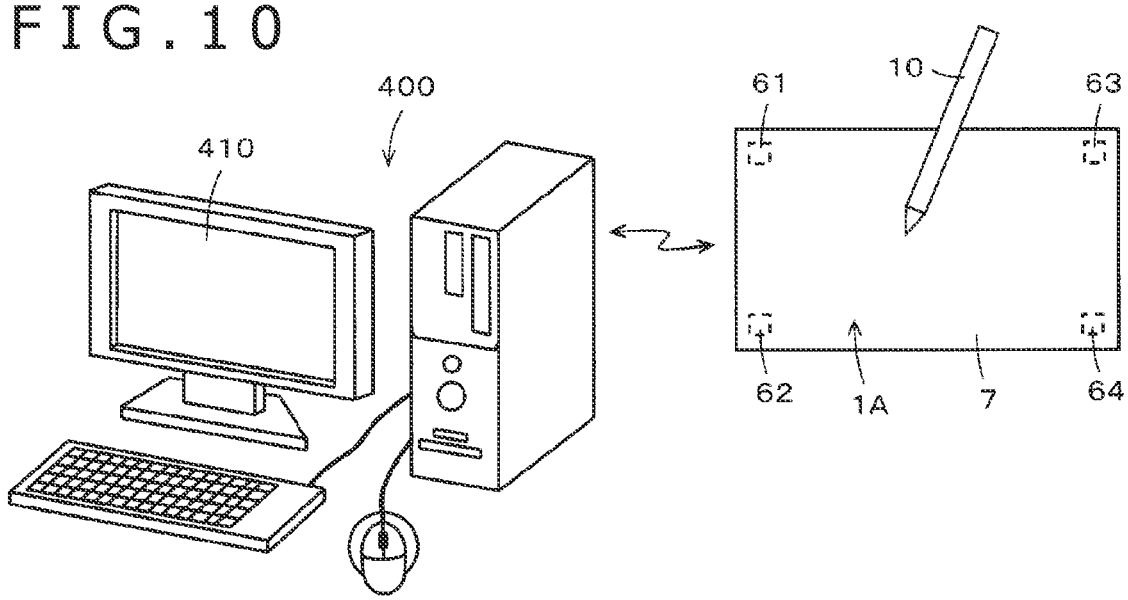
FIG. 10 is a diagram for describing an example of a second embodiment of the position detection device according to the disclosure.

A position detection device 1A of a second embodiment is what is called a tablet terminal. As illustrated in FIG. 10, the position detection device 1A is wirelessly connected to a personal computer (hereinafter, abbreviated as PC) 400 and is an input device of the PC 400. Although the position detection device 1A of the second embodiment includes the position detection sensor of electromagnetic induction type as in the first embodiment, the position detection device 1A does not include the display element including the display screen. Note that, in the description of the position detection device 1A of the second embodiment, the same reference signs are provided to the same constituent parts as those of the portable device 1 of the first embodiment, and the details of the constituent parts will not be described.

Figure 11:
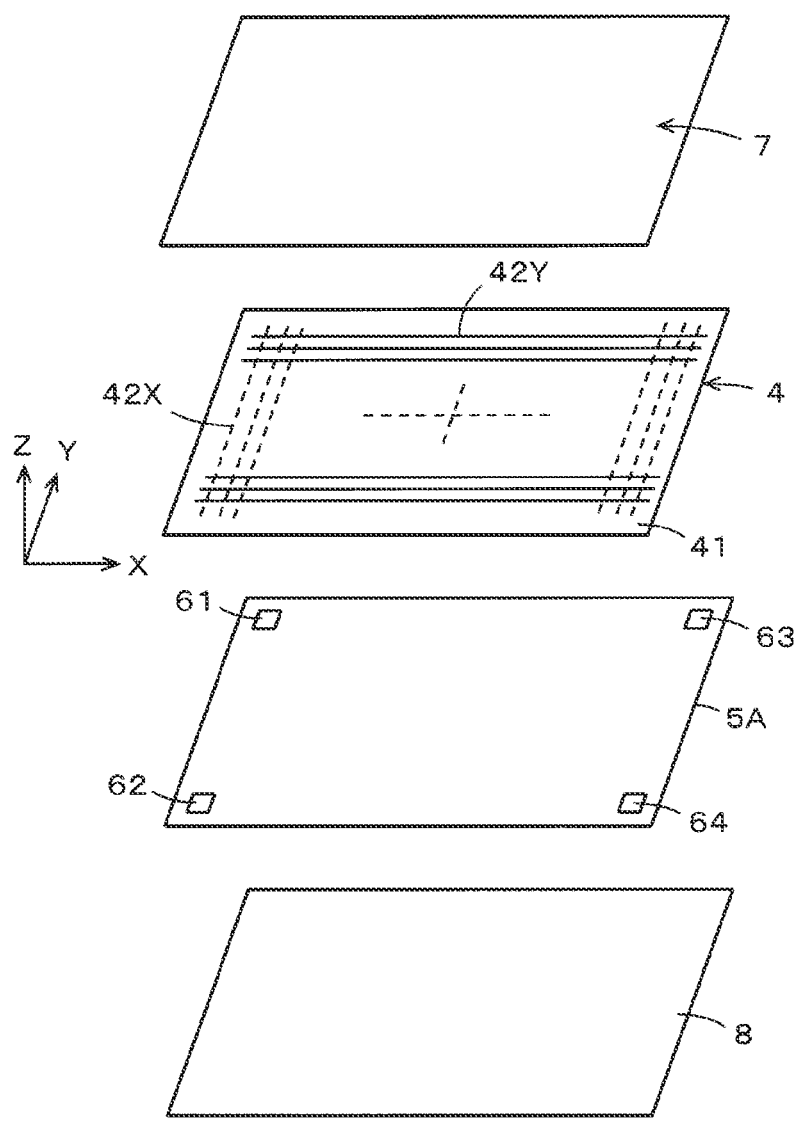
FIG. 11 is an exploded perspective view for describing a configuration example of parts in the example of the second embodiment of the position detection device according to the disclosure.

FIG. 11 is an exploded perspective view for describing a configuration example of the position detection device 1A of the second embodiment. As illustrated in FIG. 11, the position detection device 1A of the second embodiment includes the position detection sensor 4 of electromagnetic induction type and a circuit board 5A. As described above, the position detection sensor 4 includes the X-axis direction loop coil group 42X and the Y-axis direction loop coil group 42Y formed on the rectangular flexible board 41, and the position detection sensor 4 can be flexibly displaced as a whole.

The circuit board 5A is arranged on the surface side opposite the input surface side of the position detection sensor 4 as in the first embodiment, and an electronic circuit unit including the position detection circuit 100 not illustrated in FIG. 11 and a circuit that transmits output data described later is formed on a rectangular flexible board with a shape that allows to precisely place the board and the position detection sensor 4 on top of each other. Therefore, the circuit board 5A can also be flexibly displaced as a whole.

In the position detection device 1A of the second embodiment, the input surface side of the position detection sensor 4 is covered by a front surface side protection sheet 7 including a flexible member. The surface side of the circuit board 5A opposite the position detection sensor 4 side is covered by a back surface side protection sheet 8 including a flexible member. The user uses the surface of the front surface side protection sheet 7 as an input surface and inputs writing with the electronic pen 10.

The position detection device 1A of the second embodiment is configured in this way, and the position detection device 1A can be flexibly displaced as a whole.

In the position detection device 1A of the second embodiment, gyro sensors 61, 62, 63, and 64 as an example of motion sensors are arranged on four corner portions (four corners) of the rectangular circuit board 5A as illustrated in FIG. 11. Therefore, the gyro sensors 61, 62, 63, and 64 are arranged in a state in which the pivotable displaceable flexible part exists between them. In the example, the gyro sensors 61, 62, 63, and 64 are 3-axis sensors of X-axis direction (horizontal direction of the input surface of the position detection sensor 4), Y-axis direction (vertical direction of the input surface of the position detection sensor 4), and Z-axis direction (direction orthogonal to the input surface of the position detection sensor 4).

Therefore, the user can freely flex and bend the position detection device 1A, and each of the gyro sensors 61 to 64 outputs the detection output corresponding to the state change of the position detection device 1A at that time. In other words, how the state of the position detection device 1A is changed can be determined from the detection output of the gyro sensors 61 to 64.

Unlike the portable device 1 of the first embodiment, the position detection device 1A of the second embodiment does not include the process control circuit including the memory that stores the writing input data of a plurality of pages and the state change detection circuit, and the display control circuit. The position detection device 1A only has a function of wirelessly transmitting, to the PC 400, the writing input data based on the position instruction input by the electronic pen 10 and the detection output of the gyro sensors 61 to 64.

In the second embodiment, the PC 400 that receives the information wirelessly transmitted from the position detection device 1A includes a functional unit of the process control circuit including the memory that stores the writing input data of a plurality of pages and the state change detection circuit, and a functional unit of the display image generation circuit that displays the writing trace image based on the writing input data on the display screen of a display 410 included in the PC 400.

Electronic Circuit Configuration Example of Position Detection Device 1A and Parts of PC 400

Figure 12:
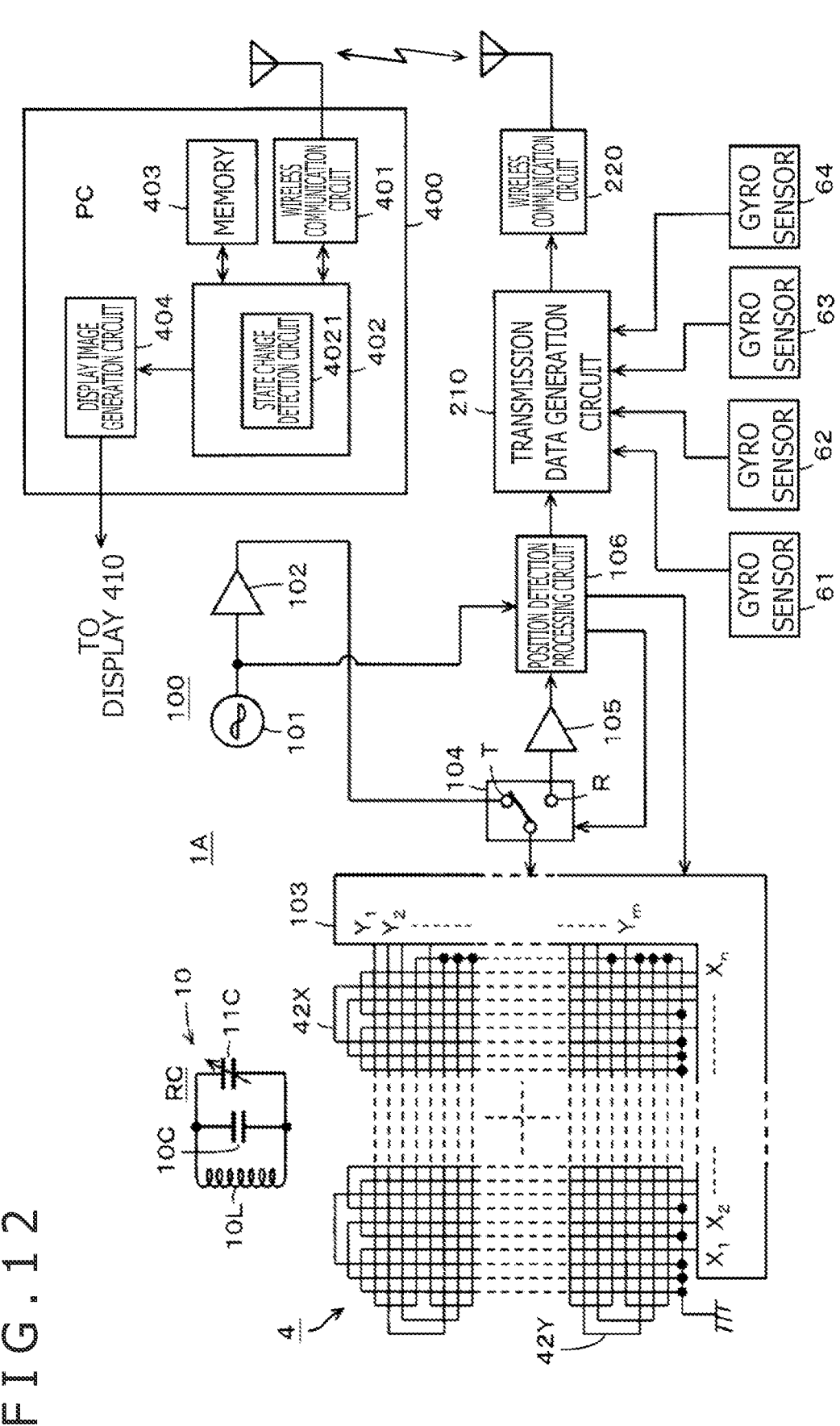
FIG. 12 is a block diagram illustrating a configuration example of an electronic circuit unit in the example of the second embodiment of the position detection device according to the disclosure.

FIG. 12 is a diagram for describing a configuration example of the electronic circuit unit of the position detection device 1A and a configuration example of parts of the PC 400 according to the second embodiment. In FIG. 12, the same reference signs are also provided to constituent parts similar to those of the portable device 1 of the first embodiment, and the details of the constituent parts will not be described. A program for the position detection device 1A of the second embodiment is installed in advance on the PC 400, and the configuration example of the PC 400 illustrated in FIG. 12 illustrates functions of the program as mechanism blocks.

In the position detection device 1A of the second embodiment, the position indicated by the electronic pen 10 on the surface of the front surface side protection sheet 7 is detected by the position detection processing circuit 106 through the position detection sensor 4 as described above. The position detection processing circuit 106 also detects the pen pressure applied to the pen tip of the electronic pen 10 and the tilt angle of the electronic pen 10 with respect to the input surface. The position detection processing circuit 106 supplies coordinate data of the detected position indicated by the electronic pen, pen pressure data, and data of tilt angle to a transmission data generation circuit 210 in the second embodiment.

The detection output of the four gyro sensors 61 to 64 is also supplied to the transmission data generation circuit 210.

The transmission data generation circuit 210 adds data t of reception time to coordinate data (x, y), pen pressure data p, and data s of tilt angle received from the position detection processing circuit 106 to generate one group of position detection output data (x, y, p, s, t) and adds data t of reception time of the detection output to detection output (G1x, G1y, G1z), (G2x, G2y, G2z), (G3x, G3y, G3z), and (G4x, G4y, G4z) about the X-axis, about the Y-axis, and about the Z-axis of the four gyro sensors 61, 62, 63, and 64 to generate one group of movement detection output data (G1x, G1y, G1z, G2x, G2y, G2z, G3x, G3y, G3z, G4x, G4y, G4z, t).

The transmission data generation circuit 210 combines the position detection output data and the movement detection output data having the same time data t to generate transmission data as in the following format and wirelessly transmits the transmission data to the PC 400 through a wireless communication circuit 220.

That is, the format of the transmission data is (x, y, p, s, G1x, G1y, G1z, G2x, G2y, G2z, G3x, G3y, G3z, G4x, G4y, G4z, t).

At predetermined time t, the data written by the electronic pen, that is, the position detection output data (x, y, p, s, t), and the movement detection output data of the gyro sensors are separately detected. Therefore, not only the information of the drawing written by the operator, but also the information of the state of the position detection device (canvas)

in which the writing is input can be recorded. When the operator uses the electronic pen to draw an image on the position detection device 1A, whether the operator stands the position detection device 1A to draw an image or whether the operator draws an image while vertically rotating the position detection device 1A can also be recorded. The environment during the drawing is recorded, and therefore, a slight movement when the operator uses the electronic pen to input writing can be recreated in reproducing the drawing data.

Note that the data written by the electronic pen and the movement detection output data of the gyro sensors may be separately recorded. This is because, in some cases, only the writing data is necessary so that the movement detection output data (environment data) of the gyro sensors during the drawing can be removed.

The position detection output data is not limited to (x, y, p, s, t), and for example, data of height h between the pen tip of the electronic pen and the writing input surface may be included.

In the PC 400, a wireless communication circuit 401 receives the transmission data from the wireless communication circuit 220 of the position detection device 1A. In the example, the wireless communication circuit 220 and the wireless communication circuit 401 are configured to perform near field communication of Bluetooth (registered trademark) standard.

As illustrated in FIG. 12, the PC 400 includes functional units including a process control circuit 402 including a state change detection circuit 4021, a memory 403 that stores, page by page, the writing input data and the movement detection output data, and a display image generation circuit 404 that generates display image information to be displayed on a display screen of a display 410. Although not illustrated in FIG. 12, the process control circuit 402 includes a page buffer.

The process control circuit 402 controls writing and reading to and from the memory 403. The display image generation circuit 404 displays, on the display screen of the display 410, the writing trace image based on the writing input data stored in the page buffer under the control of the process control circuit 402.

The state change detection circuit 4021 of the process control circuit 402 detects the state change of the position detection device 1A from the movement detection output data in the transmission data from the position detection device 1A received through the wireless communication circuit 401. In the second embodiment, control instructions corresponding to various state changes of the position detection device 1A are defined in a program for the position detection device 1A. The process control circuit 402 determines the control instruction corresponding to the state change of the position detection device 1A detected by the state change detection circuit 4021 and executes a control process corresponding to the control instruction.

Examples of various state changes of the position detection device 1A and the control instructions corresponding to the state changes will be described with reference to FIGS. 13A to 13F.

Examples of State Changes of Position Detection Device 1A and Control Instructions Corresponding to State Changes In the cases illustrated in FIGS. 13A to 13F, a plurality of pages are stored in the memory 403 of the PC 400, and the operator changes the state of the position detection device 1A while viewing the display 410 of the PC 400. Note that the position detection device 1A may include a flexible display element.

Page Turning (Next Page) Instruction: Including Change to New Page

Figure 13A:
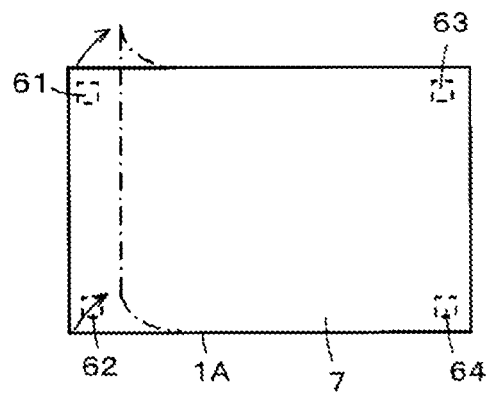
FIGS. 13A to 13F are diagrams used for describing an operation of the parts in the example of the second embodiment of the position detection device according to the disclosure.

As indicated by a chain line in FIG. 13A, a state change in which the short side on the left side of the position detection device 1A in the horizontal direction is bent to the input surface side with, for example, the pivot angle of equal to or greater than 30 degrees is a page turning (next page) instruction in the example. The state change detection circuit 4021 detects the state change illustrated in FIG. 13A by determining whether or not the pivot angle about the Y-axis of each of the gyro sensor 61 on the upper left corner and the gyro sensor 62 on the lower left corner of the position detection device 1A is equal to or greater than 30 degrees on the basis of the movement detection output $G1y$ and $G2y$ about the Y-axis of the gyro sensor 61 and the gyro sensor 62.

When the state change detection circuit 4021 detects the state change of the page turning (next page), the process control circuit 402 writes and saves, in the memory 403, the writing input data of the page buffer currently displayed on the display 410. The process control circuit 402 then reads the writing input data of the next page of the currently displayed page from the memory 403 and stores the writing input data in the page buffer. Subsequently, the process control circuit 402 stores, in the page buffer, the transmission data received from the position detection device 1A as data of the page.

When the next page of the page displayed on the display 410 is not stored in the memory 403, a page number is added to the currently displayed writing input data of the page buffer if the page number is not added, and the writing input data is stored in the memory 403. The storage data of the page buffer is deleted to provide a new page (blank page).

Figure 13B:
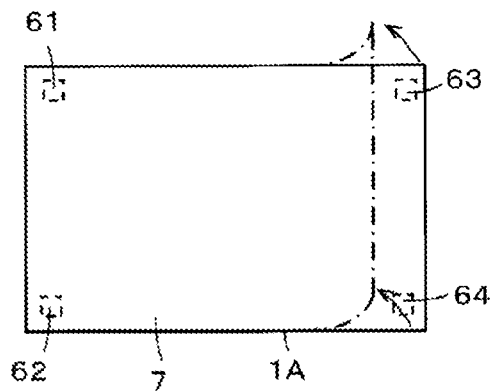
Figure 13C:
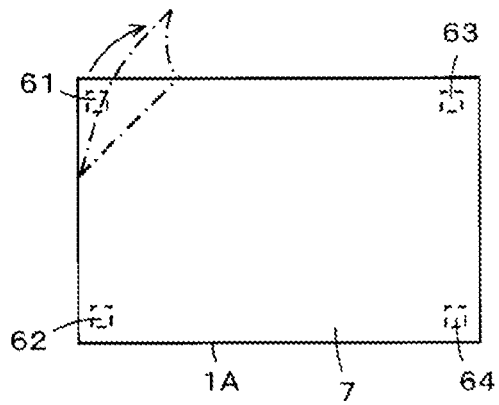

Another example of the page turning (next page) instruction may include a state change in which the upper left corner of the position detection device 1A is bent as indicated by a chain line in FIG. 13C.

Page Turning (Previous Page) Instruction

As indicated by a chain line in FIG. 13B, a state change in which the short side on the right side of the position detection device 1A in the horizontal direction is bent to the input surface side with, for example, the pivot angle of equal to or greater than 30 degrees is a page turning (previous page) instruction in the example. The state change detection circuit 4021 detects the state change illustrated in FIG. 13B by determining whether or not the pivot angle about the Y-axis of each of the gyro sensor 63 on the upper right corner and the gyro sensor 64 on the lower right corner of the position detection device 1A is equal to or greater than 30 degrees on the basis of the movement detection output $G3y$ and $G4y$ about the Y-axis of the gyro sensor 63 and the gyro sensor 64.

When the state change detection circuit 4021 detects the state change of the page turning (previous page), the process control circuit 402 writes and saves, in the memory 403, the writing input data of the page buffer currently displayed on the display 410. The process control circuit 402 then reads the writing input data of the previous page of the currently displayed page from the memory 403 and stores the writing input data in the page buffer. Subsequently, the process control circuit 402 stores, in the page buffer, the transmission data received from the position detection device 1A as data of the page.

Figure 13D:
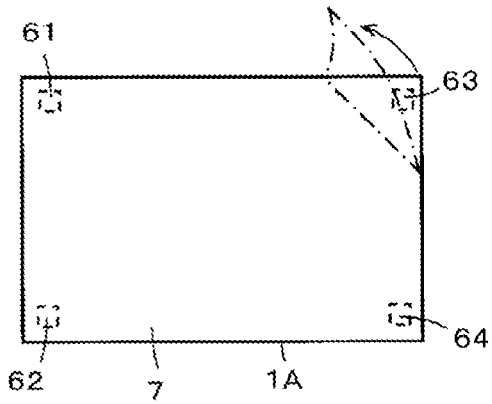

Another example of the page turning (previous page) instruction includes a state change in which the upper right corner of the position detection device 1A is bent as indicated by a chain line in FIG. 13D.

Page-by-Page Storage Instruction

In the second embodiment, a state change in which the pivot angle of the short side on the left side of the position detection device 1A in the horizontal direction is, for example, equal to or greater than 30 degrees with respect to the input surface as illustrated in FIG. 13A, and at the same time, the pivot angle of the short side on the right side of the position detection device 1A in the horizontal direction is, for example, equal to or greater than 30 degrees with respect to the input surface as illustrated in FIG. 13B is associated with a page-by-page storage instruction, although not illustrated.

When the state change detection circuit 4021 detects the state change of the page-by-page storage instruction, the process control circuit 402 stores, in the memory 403, the writing input data stored in the page buffer by then after adding the page number to the writing input data if the page number is not added or after overwriting the writing input data of the same page if the page number is added. In this case, the writing input data stored in the page buffer of the process control circuit 402 is held as it is.

Registration (Bookmark) of Page

As indicated by chain lines in FIGS. 13C and 13D, state changes of bending the upper left corner and the upper right corner of the position detection device 1A are determined to be bookmarks (markers put in a book) in the second embodiment. Once the bookmark is registered, the operator can quickly access the page to be viewed. In the second embodiment, a place where writing is to be added later can be recorded to allow the operator to quickly access the place.

That is, as illustrated in FIG. 13C, a state change in which the upper left corner of the position detection device 1A is bent to the input surface side with, for example, the pivot angle of equal to or greater than 30 degrees is determined to be registration (bookmark) of the left page. As illustrated in FIG. 13D, a state change in which the upper right corner of the position detection device 1A is bent to the input surface side with, for example, the pivot angle of equal to or greater than 30 degrees is determined to be registration (bookmark) of the right page.

The state change detection circuit 4021 of the process control circuit 402 of the PC 400 detects the state change illustrated in FIG. 13C by determining whether or not the upper left corner of the position detection device 1A is bent and the pivot angle is equal to or greater than the predetermined angle, 30 degrees in the example, on the basis of the movement detection output $G1y$ about the Y-axis and the movement detection output $G1x$ about the X-axis of the gyro sensor 61 on the upper left corner of the position detection device 1A.

The state change detection circuit 4021 of the process control circuit 402 of the PC 400 detects the state change illustrated in FIG. 13D by determining whether or not the upper right corner of the position detection device 1A is bent and the pivot angle is equal to or greater than the predetermined angle, 30 degrees in the example, on the basis of the movement detection output $G3y$ about the Y-axis and the movement detection output $G3x$ about the X-axis of the gyro sensor 63 on the upper right corner of the position detection device 1A.

The process control circuit 402 of the PC 400 displays a message "Page XX on the left is registered." on the display screen of the display 410 through the display image generation circuit 404 when the state change detection circuit 4021 detects the state change on the upper left corner of the position detection device 1A illustrated in FIG. 13C. The registered page number is displayed on the display 410 or on the display element 3. The process control circuit 402 displays a message "Page XX on the right is registered." on the display screen of the display 410 through the display image generation circuit 404 when the state change detection circuit 4021 detects the state change on the upper right corner of the position detection device 1A illustrated in FIG. 13D. The registered page number is displayed on the display 410 or on the display element.

Accessing Registered (Bookmarked) Page

Figure 13E:
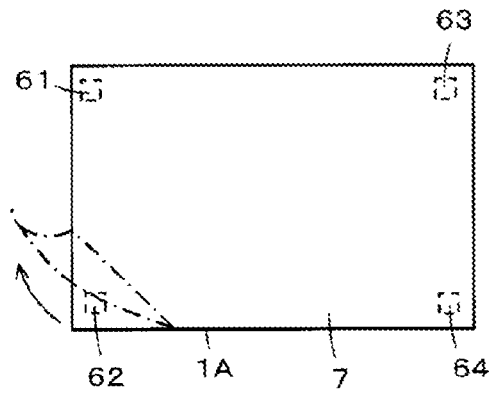
Figure 13F:
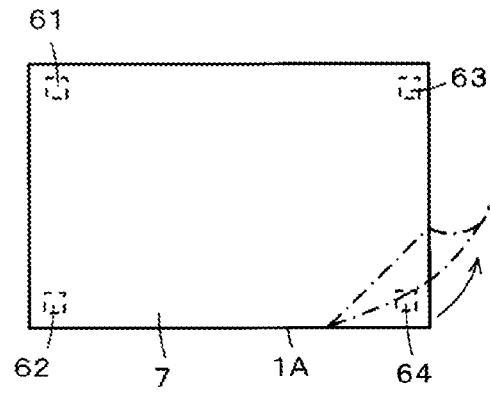

A state change of bending the lower left corner or the lower right corner of the position detection device 1A as indicated by a chain line in FIG. 13E or 13F is determined to be a case of accessing the registered page in the example.

That is, as illustrated in FIG. 13E or 13F, the state change in which the lower left corner of the position detection device 1A is bent to the input surface side with, for example, the pivot angle of equal to or more than 30 degrees is determined to be an instruction for moving to the registered page. In the example, the lower right corner and the lower left corner operate in the same way.

In this way, the entire position detection device 1A of the second embodiment is the flexibly displaceable part, and the gyro sensors 61 to 64 are provided at four corners of the rectangular external shape of the position detection device 1A. The detection output of the four gyro sensors 61 to 64 can be used to detect various state changes of the position detection device 1A.

In the position detection device 1A of the second embodiment, the control instructions in the position detection device 1A are associated and allocated to various state changes that can be detected by using the detection output of the four gyro sensors 61 to 64. In this way, the position detection device 1A can execute various control processes in a system in which the position detection device 1A is an input device of a personal computer.

In the second embodiment, the writing input data and the detection output of the gyro sensors 61 to 64 are transmitted from the position detection device 1A to the personal computer 400 in a predetermined transmission format in which the writing input data and the detection output are associated by time and combined, and therefore, the writing input can be associated with the movement or the state change of the position detection device 1A. There is an advantageous effect that the condition of the position detection device 1A during the writing input operation can be determined.

Modifications of Second Embodiment

Although the gyro sensors are arranged at all four corners of the rectangular position detection device 1A in the second embodiment, the gyro sensors may be arranged at positions of any two or more of the four corners.

Although the position detection device 1A does not include the display element that displays the trajectory of the indicated position input by the electronic pen 10 in the embodiment, the position detection device 1A may include a display element, such as an organic EL element and electronic paper, including a flexible displaceable member as in the first embodiment.

For example, any electronic paper including a flexible displaceable member of magnetic induction type, electrophoresis type, or other types can be used.

Other Embodiments or Modifications

The motion sensor is not limited to the gyro sensor as in the examples, and other motion sensors, such as acceleration sensors, can be obviously used.

Although the state change of the position detection device is associated with the control instruction of a predetermined process of the position detection device in the embodiments, the state change may be associated with modification or transformation of the writing input data or with assignment of attributes regarding the writing input data instead of the control instruction.

Figure 14:
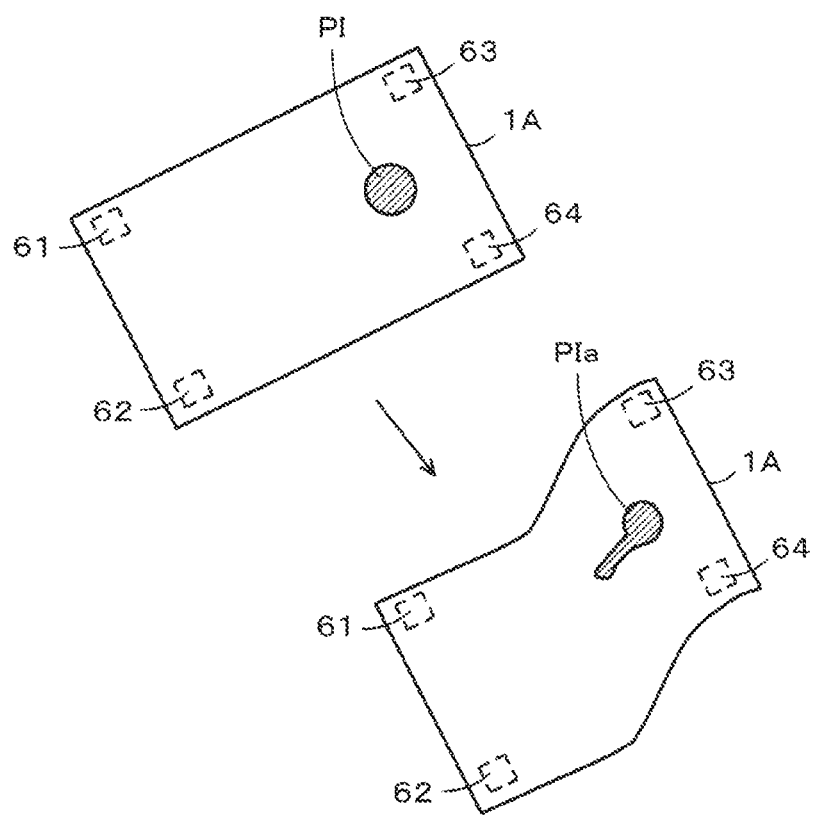
FIG. 14 is a diagram used for describing an operation of parts in an example of another embodiment of the position detection device according to the disclosure.

For example, the position detection device 1A of the second embodiment that can be entirely flexibly displaced may be used as, for example, a canvas. The user may use the electronic pen to input a drop of ink to form an ink mark PI as illustrated in FIG. 14 and then wave the position detection device 1A to change the state as illustrated in FIG. 14. In this case, the writing input data may be modified or transformed according to the state change to deform the image into an image PIa of the ink dripping from the ink mark PI.

In addition, by placing the position detection device 1A (may include the display element) with the upper long side facing up and the lower long side facing down, the writing input data drawn on the entire surface of the position detection device 1A can be expressed in a manner that the drawing data drips from top to bottom. In addition, the tilt can be changed to express the speed of movement (dripping speed). Further, the right short side can be moved up and down, or the left short side can be moved up and down to deform the drawn object according to the movement of the position detection device (canvas).

Although the position detection device of the embodiments includes the position detection sensor of electromagnetic induction type, the position detection device may include a position detection sensor of capacitance type (including active capacitive coupling type).

Note that a touch panel of capacitance type that detects a touch of the finger may be used instead of the position detection device in which the electronic pen can be used. In this case, a motion sensor, such as a gyro sensor, can also be provided to detect the movement of the position detection device, and operations and advantageous effects similar to those described above can be obtained.

Although the outer casing is changed from the folded closed state to the open state with the first frame member and the second frame member forming an angle of 180 degrees to thereby form the planar display screen 3P in the position detection device of the first embodiment, the display screen may be exposed even when the outer casing is folded and closed, and the planar display screen 3P may be formed when the outer casing is opened 180 degrees. In addition, the display screen may be closed, folded, and prevented from being exposed when the angle formed by the first frame member and the second frame member is 0 degrees, and the display screen may be kept exposed when the angle formed by the first frame member and the second frame member is 360 degrees.

Although the size of the circuit board is the same as the size of the sensor board in the first and second embodiments, the size of the circuit board may be the size of part of the sensor board, or the circuit board may have a band shape. It is only necessary that the sensor board be extended to the part where the motion sensor, such as a gyro sensor, is arranged. In addition, the motion sensor may not be arranged on the circuit board as long as the motion sensor is electrically connected to the circuit board.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position detection device comprising:
a position detection sensor including a position detection region corresponding to an instruction input surface for receiving an instruction input by an indicator;
a position detection circuit which, in operation, detects at least a pressure applied to the indicator, a tilt angle of the indicator, and a position of the indicator in the position detection region of the position detection sensor based on an interaction of the position detection sensor and the indicator; and
a plurality of motion sensors,
a holding circuit which, in operation, holds output data from the position detection circuit in association with a reception time of the output data from the position detection circuit, and holds output data from the plurality of motion sensors in association with a reception time of the output data from the plurality of motion sensors,
a transmission data generation circuit which, in operation, generates transmission data by adding a time value to the pressure applied to the indicator, the tilt angle of the indicator, the position of the indicator, and the output data from the plurality of motion sensors, wherein the time value is same as the reception time of the output data from the position detection circuit and the reception time of the output data from the plurality of motion sensors; and
a communication circuit which, in operation, transmits to outside of the position detection device the transmission data generated by the transmission data generation circuit.

2. The position detection device according to claim 1, wherein the motion sensors are gyro sensors which, in operation, measure angular velocity about at least one axis.

3. The position detection device according to claim 1, wherein the position detection sensor includes a flexibly displaceable part that is deformable together with the instruction input surface according to an operation of a user, and wherein the flexibly displaceable part is provided at a position that divides the instruction input surface into two regions and enables folding of the instruction input surface.

4. The position detection device according to claim 3, wherein at least one of the motion sensors is provided in each of the two regions divided by the flexibly displaceable part.

5. The position detection device according to claim 4, wherein the at least one of the motion sensors provided in each of the two regions divided by the flexibly displaceable part is a gyro sensor which, in operation, measures at least angular velocity about one axis with an axial direction along the flexibly displaceable part.

6. The position detection device according to claim 4, wherein the at least one of the motion sensors provided in each of the two regions divided by the flexibly displaceable part is a gyro sensor, which in operation, measures angular velocity about two or more axes including one axis with an axial direction along the flexibly displaceable part.

7. The position detection device according to claim 3, wherein the motion sensors are provided at center parts of the two regions divided by the flexibly displaceable part.

8. The position detection device according to claim 3, wherein the motion sensors are provided at corners of the two regions divided by the flexibly displaceable part.

9. The position detection device according to claim 1, wherein the position detection sensor includes a flexibly displaceable part that is deformable together with the instruction input surface according to an operation of a user, and wherein an entire region of the instruction input surface includes the flexibly displaceable part.

10. The position detection device according to claim 9, wherein:
the instruction input surface has a rectangular shape, and
the motion sensors are arranged at at least two of four corners of the instruction input surface.

11. The position detection device according to claim 1, wherein:
the instruction input surface has a rectangular shape,
flexibly displaceable parts are included at at least two of four corners of the instruction input surface, and
motion sensors are arranged at the flexibly displaceable parts.

12. The position detection device according to claim 1, further comprising:
a trajectory display unit disposed over the position detection region of the position detection sensor,
wherein the position detection sensor includes a flexibly displaceable part that is deformable together with the instruction input surface according to an operation of a user,
wherein the trajectory display unit, in operation, displays a trajectory of an indicated position on the instruction input surface indicated by the indicator, and
wherein at least part of the trajectory display unit that overlaps the flexibly displaceable part is flexible and deformable together with the instruction input surface.

13. The position detection device according to claim 12, wherein the trajectory display unit includes paper.

14. The position detection device according to claim 12, wherein the trajectory display unit includes a display element including electronic paper, a liquid crystal display, or an organic electroluminescent display that displays the trajectory of the indicated position as a display image.

15. The position detection device according to claim 14, further comprising:
a determination circuit which, in operation, determines a mode of detected motion based on output data of the plurality of motion sensors; and
a display image generation circuit which, in operation, generates a display image of the trajectory of the indicated position based on output data of the position detection circuit and changes a display image of the display element based on a determination result of the determination circuit.

16. The position detection device according to claim 15, further comprising:
a memory which, in operation, holds the output data of the position detection circuit corresponding to a plurality of pages,
wherein the position detection device, in operation, changes the display image of the display element to an image that appears after a page is turned based on the determination result of the determination circuit.

17. The position detection device according to claim 1, further comprising:
a determination circuit which, in operation, determines a mode of detected motion based on output data of the plurality of motion sensors; and
a power supply circuit,
wherein the position detection device controls the power supply circuit based on a result of a determination by the determination circuit.

* * * * *